US010928417B2

(12) United States Patent
Sakai

(10) Patent No.: US 10,928,417 B2
(45) Date of Patent: Feb. 23, 2021

(54) ATOMIC FORCE MICROSCOPE, ATOMIC FORCE MICROSCOPY, AND CONTROLLING METHOD OF AN ATOMIC FORCE MICROSCOPY

(71) Applicant: OLYMPUS CORPORATION, Tokyo (JP)

(72) Inventor: Nobuaki Sakai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/682,124

(22) Filed: Nov. 13, 2019

(65) Prior Publication Data
US 2020/0081032 A1    Mar. 12, 2020

Related U.S. Application Data

(63) Continuation of application No. PCT/JP2017/018214, filed on May 15, 2017.

(51) Int. Cl.
*G01Q 10/06*    (2010.01)
*G01Q 60/24*    (2010.01)

(52) U.S. Cl.
CPC ............. *G01Q 10/06* (2013.01); *G01Q 60/24* (2013.01)

(58) Field of Classification Search
CPC ........ G01Q 60/24; G01Q 10/00; G01Q 10/02; G01Q 10/04; G01Q 10/045; G01Q 10/06; G01Q 10/065; G01Q 20/00
USPC .................................. 850/1, 2, 3, 4, 5, 14, 15
See application file for complete search history.

(56) References Cited

U.S. PATENT DOCUMENTS

2005/0242283 A1*  11/2005  Hasegawa .............. G01Q 30/04
                                                          250/310

FOREIGN PATENT DOCUMENTS

| JP | H10-282123 A     | 10/1998 |
|----|------------------|---------|
| JP | H11-038019 A     | 2/1999  |
| JP | 2001-108601 A    | 4/2001  |
| JP | 4083517 B2       | 4/2008  |
| WO | WO2010/087114 A1 | 8/2010  |
| WO | WO 2017/006436 A1| 1/2017  |

OTHER PUBLICATIONS

International Search Report dated Aug. 15, 2017 issued in PCT/JP2017/018214.

(Continued)

*Primary Examiner* — Nicole M Ippolito
(74) *Attorney, Agent, or Firm* — Scully, Scott, Murphy & Presser, P.C.

(57) ABSTRACT

An atomic force microscope includes a raster scan control mechanism configured to perform a raster scan between a cantilever having a probe at a free end and a sample relative to each other across an XY plane in a fluid, an interaction control mechanism configured to vibrate the cantilever and to control an interaction generated between the probe and the sample, and a sample information acquisition circuit configured to acquire sample information including inclination information of a sample surface with respect to the XY plane based on a control result of the interaction control mechanism. The interaction control mechanism is configured to control the interaction generated between the probe and the sample in accordance with inclination of the sample surface with respect to the XY plane.

14 Claims, 20 Drawing Sheets

(56) References Cited

OTHER PUBLICATIONS

English Abstract of JP 2004-101202 A, dated Apr. 2, 2004.
English translation of International Preliminary Report on Patentability dated Nov. 28, 2019, together with the Written Opinion received in related International Application No. PCT/JP2017/018214.

* cited by examiner

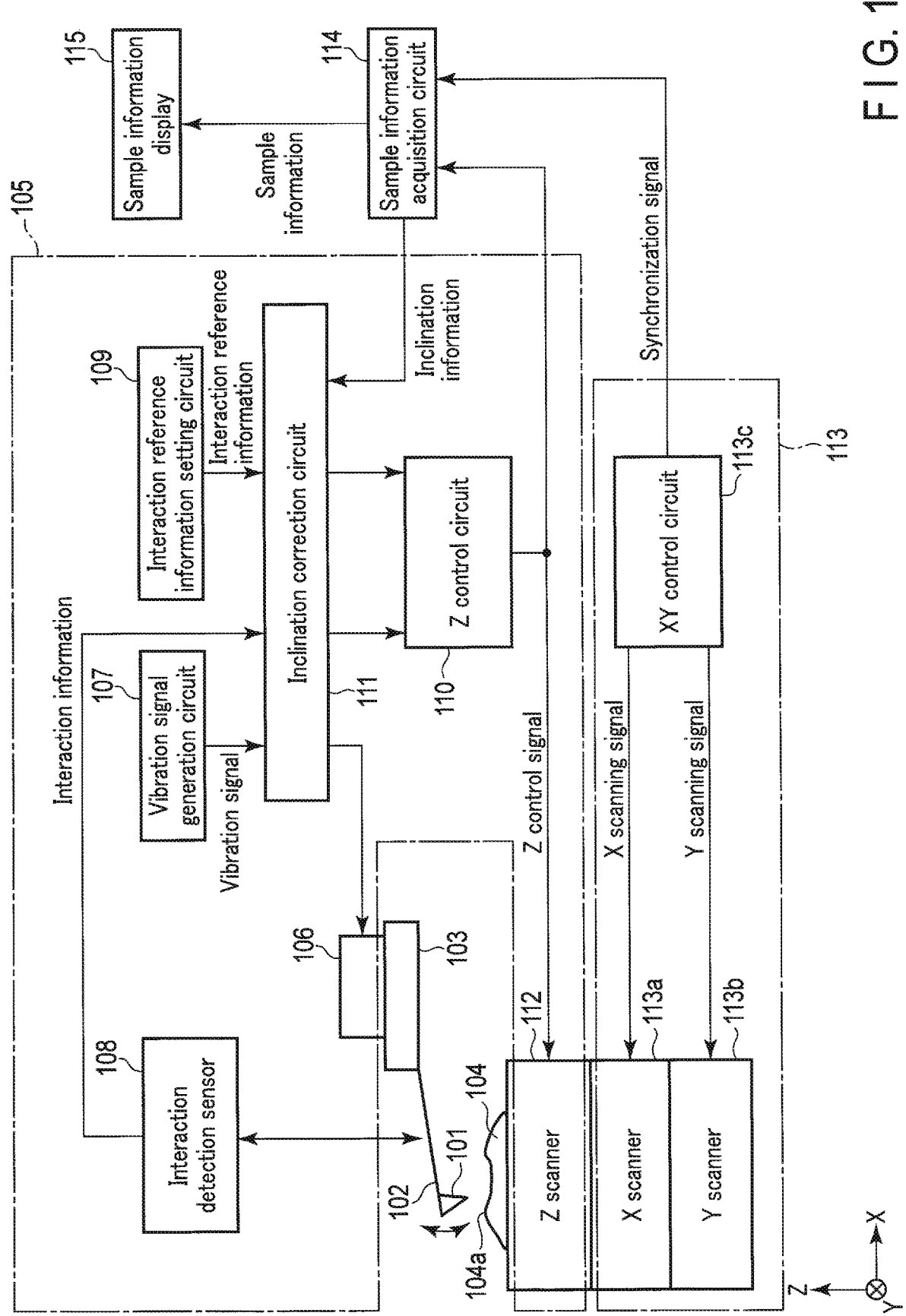
F I G. 1

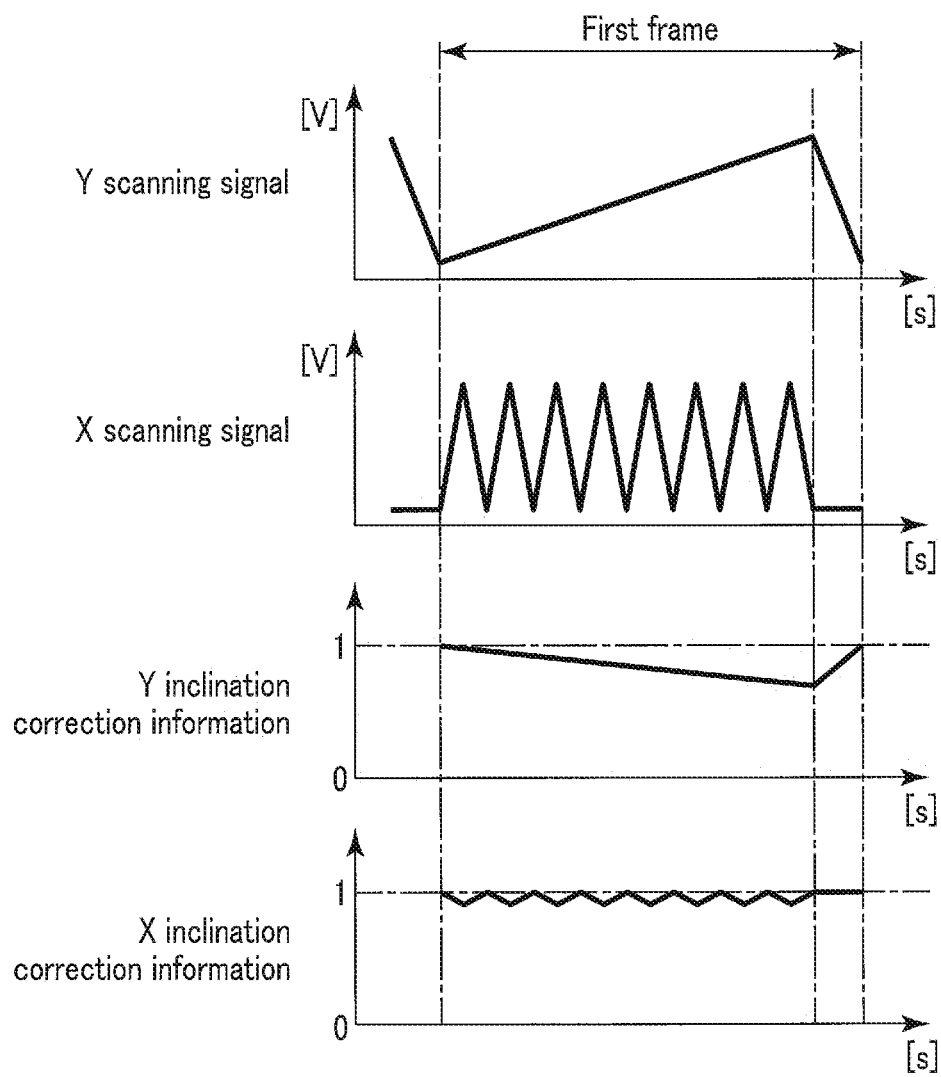
F I G. 17

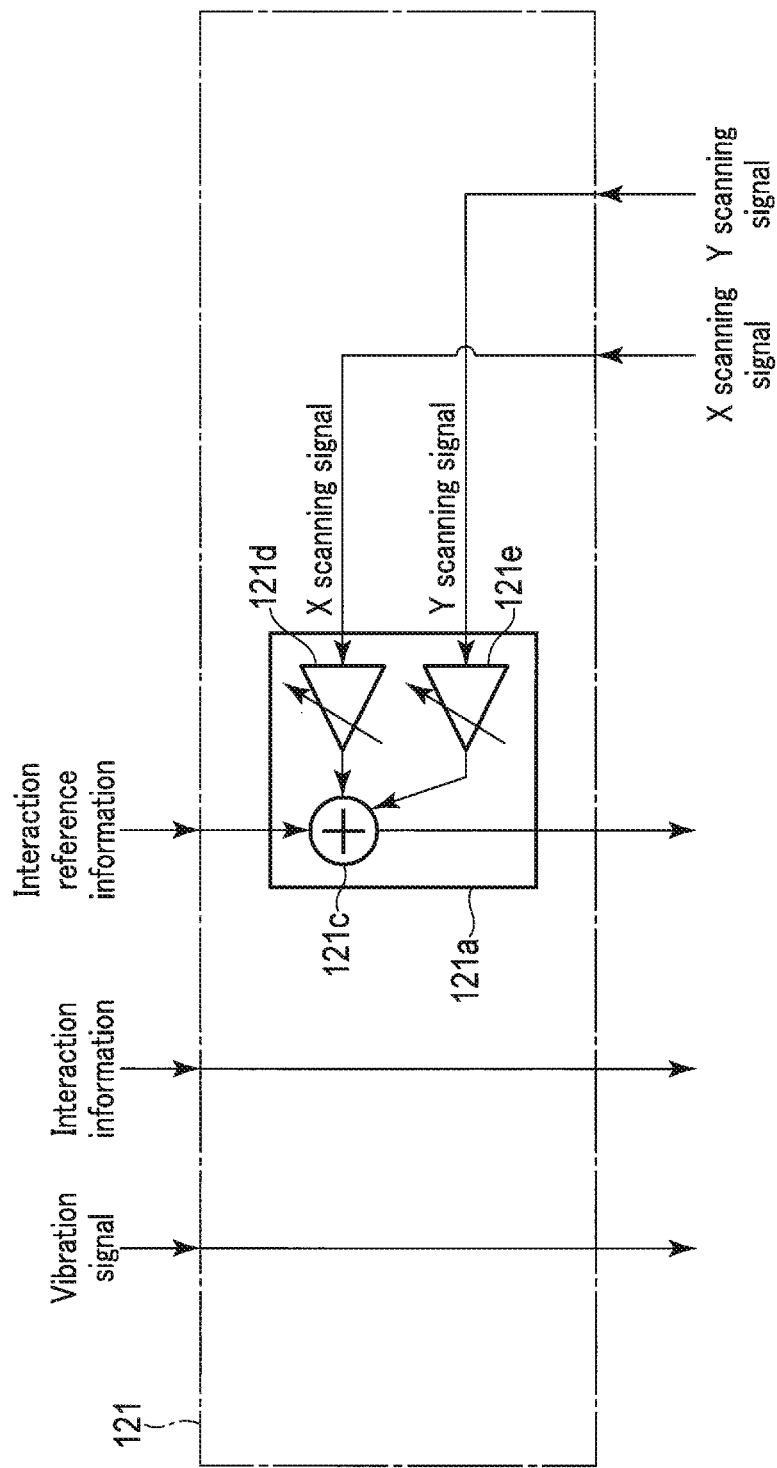
F I G. 20

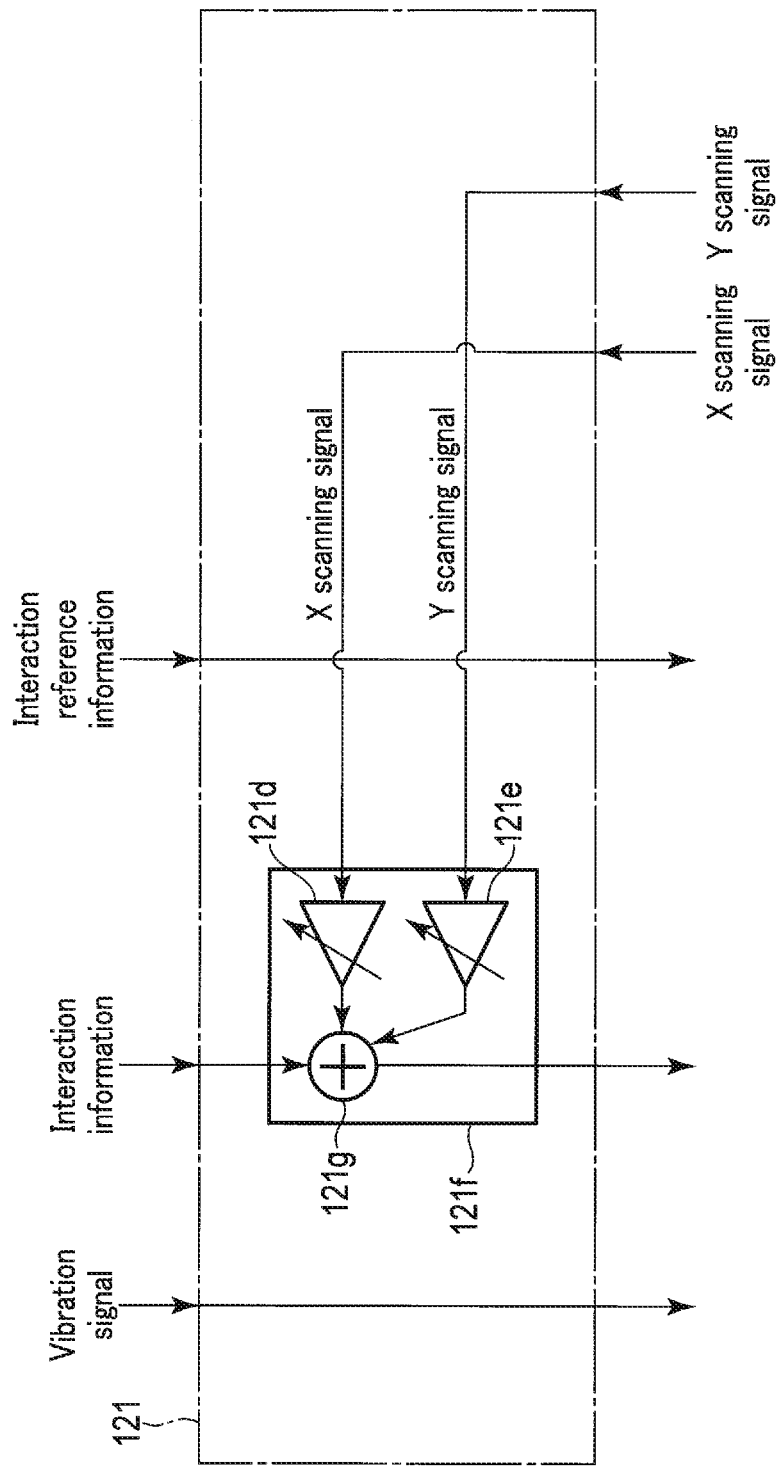
F I G. 21

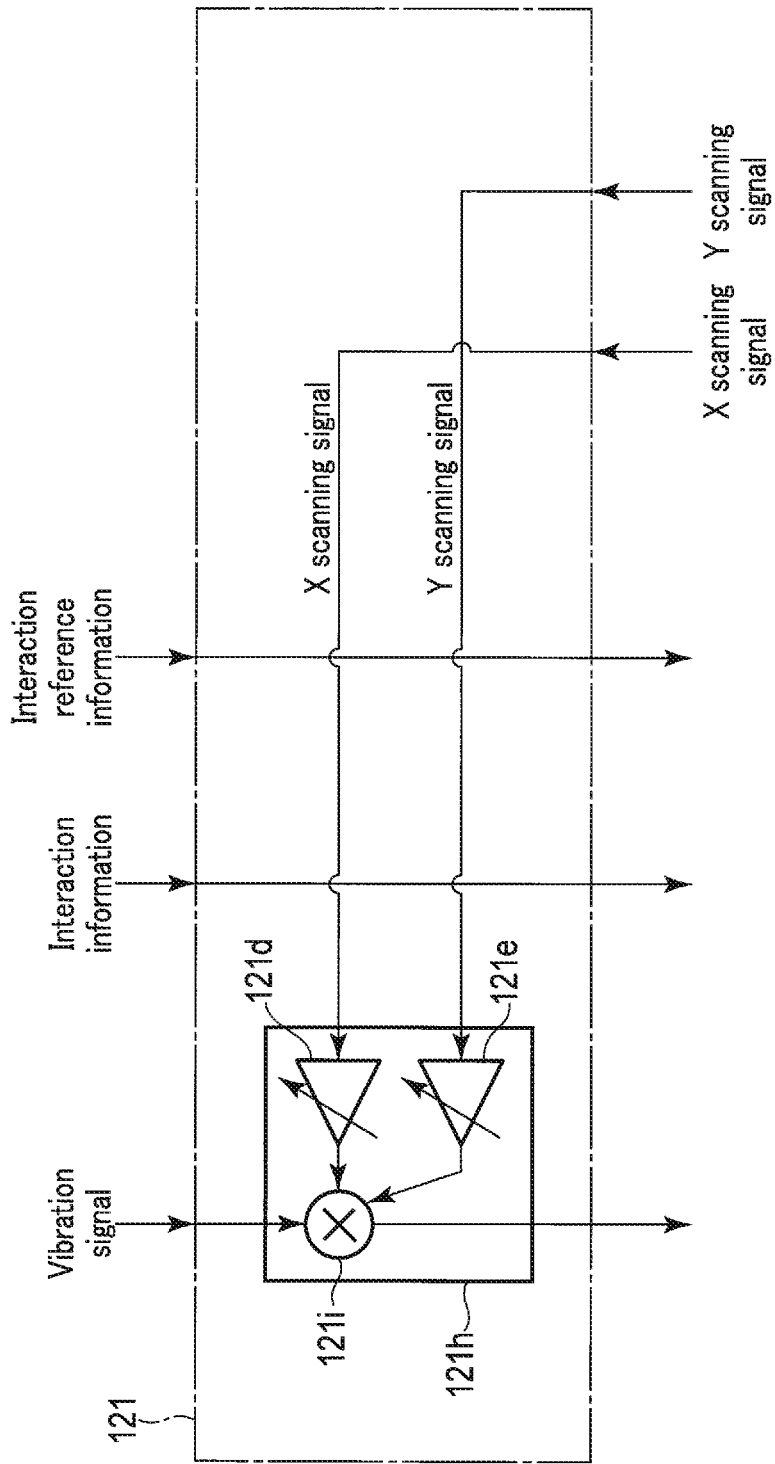
F I G. 22

ATOMIC FORCE MICROSCOPE, ATOMIC FORCE MICROSCOPY, AND CONTROLLING METHOD OF AN ATOMIC FORCE MICROSCOPY

CROSS-REFERENCE TO RELATED APPLICATIONS

This application is a Continuation Application of PCT Application No. PCT/JP2017/018214, filed May 15, 2017, the entire contents of which are incorporated herein by reference.

BACKGROUND OF THE INVENTION

1. Field of the Invention

The present invention relates to a scanning probe microscope, particularly, an atomic force microscope used under an in-solution environment, an atomic force microscopy, and a controlling method of the atomic force microscopy.

2. Description of the Related Art

A scanning probe microscope (SPM) is a scanning microscope configured to obtain information on a sample surface while mechanically scanning a mechanical probe, and includes a scanning tunneling microscope (STM), an atomic force microscope (AFM), a scanning magnetic force microscope (MFM), a scanning capacitance microscope (SCaM), a scanning near-field light microscope (SNOM), etc.

The scanning probe microscope performs a raster scan between the mechanical probe and the sample relative to each other in the X and Y directions to acquire desired surface information of the sample through the mechanical probe, so as to mapping-display the surface information on a display. In particular, the atomic force microscope uses a cantilever having a mechanical probe at its free end to generate a dynamic interaction between the mechanical probe and the sample, and acquires sample information based on the deformation of the cantilever caused by the dynamic interaction. For example, Japanese Patent No. 4083517 discloses one of such atomic force microscopes. Atomic force microscopes can be used also in various environments such as ultra-high vacuum and solutions as well as in the atmosphere, and are the most widely used devices.

BRIEF SUMMARY OF THE INVENTION

An atomic force microscope according to the present invention includes a raster scan control mechanism configured to perform a raster scan between a cantilever having a probe at a free end and a sample relative to each other across an XY plane in a fluid, an interaction control mechanism configured to vibrate the cantilever and to control an interaction generated between the probe and the sample, and a sample information acquisition circuit configured to acquire sample information including inclination information of a sample surface with respect to the XY plane based on a control result of the interaction control mechanism. The interaction control mechanism is configured to control the interaction generated between the probe and the sample in accordance with inclination of the sample surface with respect to the XY plane.

An atomic force microscopy according to the present invention includes: a sample table configured to place on a sample; a cantilever configured to relatively move on the sample table; and one or more circuits configured to: scan on an XY plane of the sample by vibrating the cantilever; detect an first interaction between the cantilever and the sample; calculate inclination on a surface of the sample based on the first interaction; and control the cantilever or the sample table based on the inclination.

A controlling method of an atomic force microscopy according to the present invention includes: scanning on an XY plane of a sample by vibrating a cantilever; detecting an first interaction between the cantilever and the sample; calculating inclination relative to the XY plane on a surface of the sample based on the first interaction; and controlling the cantilever or a sample table based on the inclination, the sample table is configured to place on the sample.

Advantages of the invention will be set forth in the description that follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows a configuration of an atomic force microscope according to a first embodiment.

FIG. 17 shows an X scanning signal and a Y scanning signal, and a normalized signal of the X inclination correction information and a normalized signal of the Y inclination correction information.

FIG. 20 shows a configuration of an inclination correction circuit configured to change the magnitude of a signal of the interaction reference information.

FIG. 21 shows a configuration of an inclination correction circuit configured to change the magnitude of a signal of the interaction information.

FIG. 22 shows a configuration of an inclination correction circuit configured to change the magnitude of a vibration signal.

DETAILED DESCRIPTION OF THE INVENTION

First Embodiment

Figure 2:
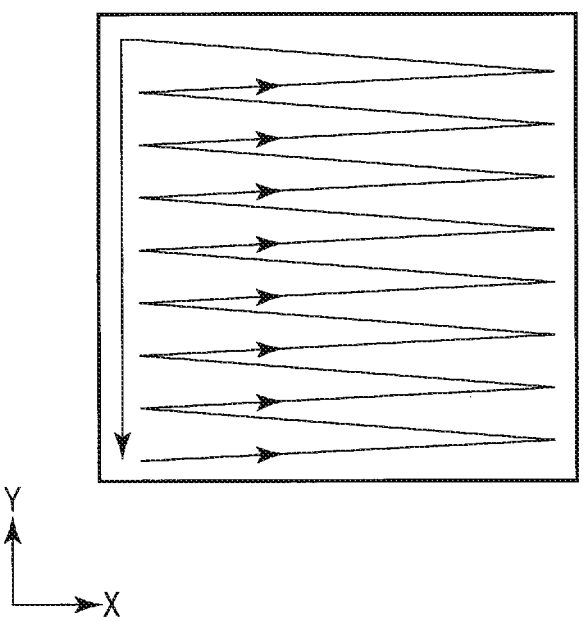
FIG. 2 shows the movement of a raster scan between a probe and a sample relative to each other across the XY plane.

A first embodiment will be described with reference to FIGS. 1 to 18.

FIG. 1 shows a configuration of an atomic force microscope according to the first embodiment.

As shown in FIG. 1, in the atomic force microscope of the present embodiment, a cantilever 102 having a probe 101 at the free end is arranged so as to directly face a sample 104. The cantilever 102 is held on the substrate 103. In the present embodiment, at least the sample 104, the probe 101, and the cantilever 102 are immersed in a fluid (not shown) such as a solution.

A vibration element 106 is provided on the substrate 103. The vibration element 106 vibrates the cantilever 102 through the substrate 103. The vibration element 106 is supplied with a vibration signal generated by the vibration signal generation circuit 107 through an inclination correction circuit 111, which will be described later, and thereby vibrates the cantilever 102 in a predetermined vibration state, namely, with a predetermined amplitude, a predetermined frequency, and a predetermined phase. The frequency for vibrating the cantilever 102 is set near the primary resonance frequency of the cantilever 102 in the solution. The vibration element 106 is constituted from a piezoelectric body, for example.

An interaction detection sensor 108 configured to is disposed above the cantilever 102. The interaction detection sensor 108 detects the vibration state of the cantilever 102 to output the vibration state as interaction information including information on the interaction between the probe 101 and the sample 104. The interaction information output from the interaction detection sensor 108 is supplied to the Z control circuit 110 through the inclination correction circuit 111, which will be described later.

The interaction information includes vibration amplitude information, vibration frequency information, or phase information of the cantilever 102.

The sample 104 is held by the Z scanner 112 through a sample table (not shown).

The Z scanner 112 scans the sample 104 with respect to the cantilever 102 along a Z axis perpendicular to an XY plane. That is, the Z scanner 112 performs a scan between the cantilever 102 and the sample 104 relative to each other along the Z axis perpendicular to the XY plane.

The Z scanner 112 is mounted on the Y scanner 113b and the X scanner 113a. Specifically, the X scanner 113a is mounted on the Y scanner 113b, and the Z scanner 112 is mounted on the X scanner 113a.

The X scanner 113a scans the sample 104 with respect to the cantilever 102 along an X axis. That is, the X scanner 113a performs a scan between the cantilever 102 and the sample 104 relative to each other along the X axis.

The Y scanner 113b scans the sample 104 with respect to the cantilever 102 along a Y axis. That is, the Y scanner 113b performs a scan between the cantilever 102 and the sample 104 relative to each other along the Y axis.

The X scanner 113a and the Y scanner 113b are controlled by an XY control circuit 113c. Specifically, the X scanner 113a and the Y scanner 113b are respectively controlled by an X scanning signal and a Y scanning signal generated by the XY control circuit 113c.

The X scanner 113a, the Y scanner 113b, and the XY control circuit 113c constitute a raster scan control mechanism 113. The raster scan control mechanism 113 can perform a raster scan between the cantilever 102 and the sample 104 relative to each other across the XY plane.

Here, a raster scan will be described with reference to FIGS. 2 and 3.

FIG. 2 shows the movement of the raster scan between the probe 101 provided on the cantilever 102 and the sample 104 relative to each other across the XY plane. This raster scan is generally used in atomic force microscopes, and a scanning line direction (a direction in which the scanning speed is high) of the raster scan is generally set in an X direction.

Figure 3:
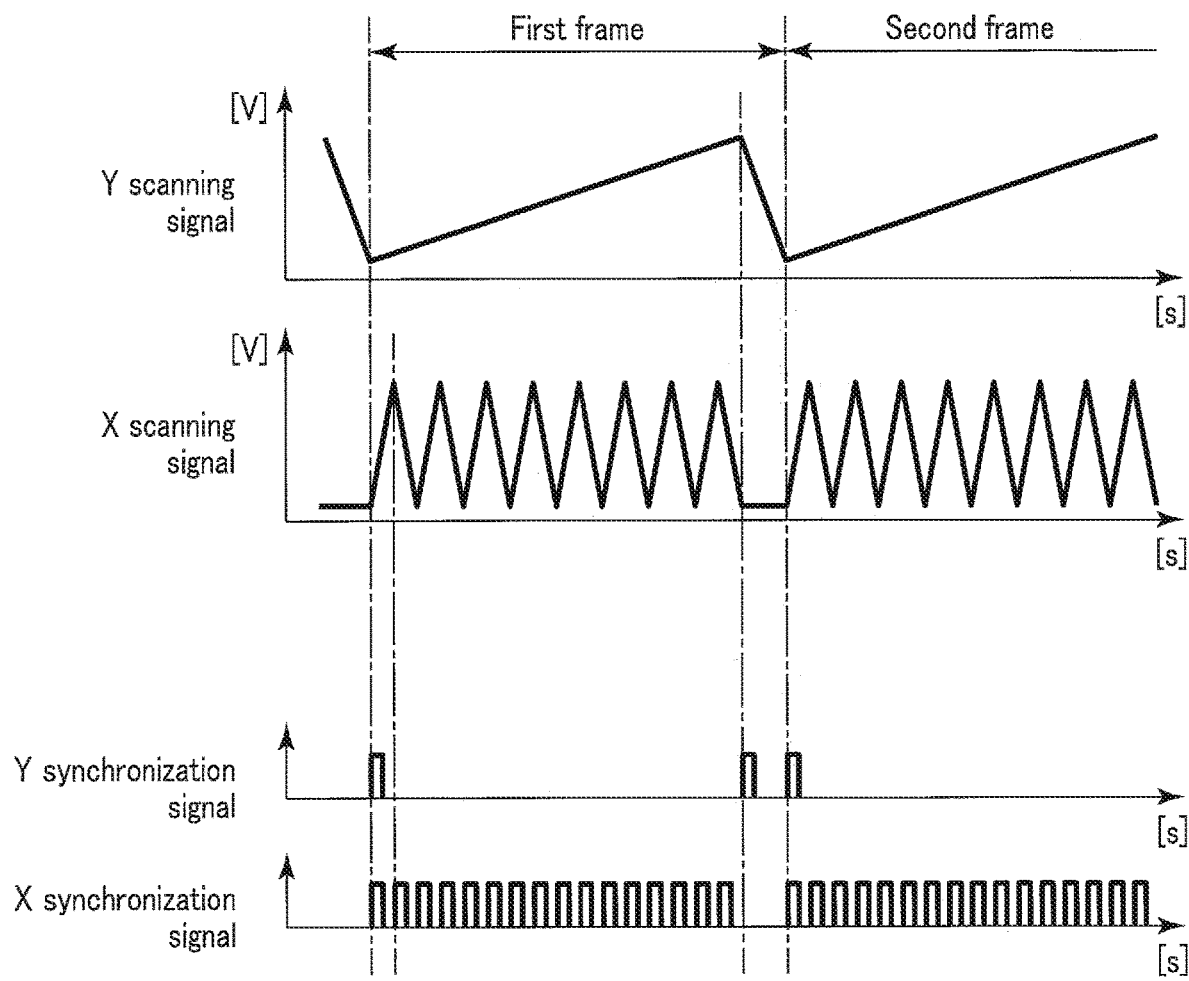
FIG. 3 shows waveforms of a Y scanning signal and an X scanning signal for performing the raster scan shown in FIG. 2, and respective synchronization signals for the Y scanning signal and the X scanning signal.

FIG. 3 shows waveforms of the Y scanning signal and the X scanning signal for performing the raster scan shown in FIG. 2, and respective synchronization signals for the Y scanning signal and the X scanning signal. These synchronization signals are output from the XY control circuit 113c and supplied to a sample information acquisition circuit 114, which will be described later.

In FIG. 1 again, the interaction reference information setting circuit 109 sets interaction reference information indicating the desired magnitude of the interaction between the probe 101 and the sample 104. The set interaction reference information is supplied to the Z control circuit 110 through the inclination correction circuit 111, which will be described later.

The Z scanner 112 is controlled by the Z control circuit 110. Specifically, the Z control circuit 110 receives interaction information including information regarding the vibration state of the cantilever 102, namely, the interaction between the probe 101 and the sample 104, and interaction reference information indicating a desired magnitude of interaction between the probe 101 and the sample 104 to generate deviation information between the interaction information and the interaction reference information. The Z control circuit 110 generates a Z control signal for keeping a vibration state of the cantilever 102, for example, the magnitude of the vibration amplitude, constant based on the deviation information, to cause the Z scanner 112 to expand and contract along the Z direction based on the Z control signal, so as to scan the sample 104 along the Z direction with respect to the cantilever 102. That is, the relative distance along the Z direction between the cantilever 102 and the sample 104 is controlled by the Z control circuit 110. The Z control signal generated by the Z control circuit 110 is also supplied to the sample information acquisition circuit 114.

The vibration element 106, the vibration signal generation circuit 107, the interaction detection sensor 108, the interaction reference information setting circuit 109, the Z control circuit 110, the inclination correction circuit 111 (described later), and the Z scanner 112 constitute an interaction control mechanism 105. The interaction control mechanism 105 can vibrate the cantilever 102 and control the interaction generated between the probe 101 provided at the free end of the cantilever 102 and the sample 104.

The sample information acquisition circuit 114 acquires sample information based on the Z control signal and synchronization signals for the raster scan output from the XY control circuit 113c. This sample information includes inclination information of a sample surface 104a with respect to the XY plane. This sample information is, for example, information reflecting the uneven shape of the sample surface 104a.

The sample information acquired by the sample information acquisition circuit 114 is supplied to the sample information display 115. The sample information display 115 displays the acquired sample information.

Further, the sample information acquisition circuit 114 extracts inclination information of the sample surface 104a with respect to the XY plane from the acquired sample information by image processing such as filtering, and then supplies the inclination information to an inclination correction circuit 111 included in the interaction control mechanism 105.

As described above, the atomic force microscope of the present embodiment used in the fluid such as a solution includes: the interaction control mechanism 105, which is constituted by the vibration element 106, the vibration signal generation circuit 107, the interaction detection sensor 108, the interaction reference information setting circuit 109, the Z control circuit 110, the inclination correction circuit 111 (described later), and the Z scanner 112, configured to vibrate the cantilever 102 and to control the interaction generated between the probe 101 provided at the free end of the cantilever 102 and the sample 104; the raster scan control mechanism 113, which is constituted by the X scanner 113a, the Y scanner 113b, and the XY control circuit 113c, configured to perform the raster scan between the cantilever 102 and the sample 104 relative to each other across the XY plane; the sample information acquisition circuit 114 configured to acquire the sample information including the inclination information of the sample surface with respect to the XY plane based on the Z control signal as the control result of the interaction control mechanism 105; and the sample information display 115 configured to display the sample information.

The atomic force microscope of the present embodiment is characterized by the interaction control mechanism 105. For this purpose, the interaction control mechanism 105 includes the inclination correction circuit 111.

Before describing the inclination correction circuit 111, the conventional problem will be described in detail with reference to FIGS. 4 to 10.

Figure 4:
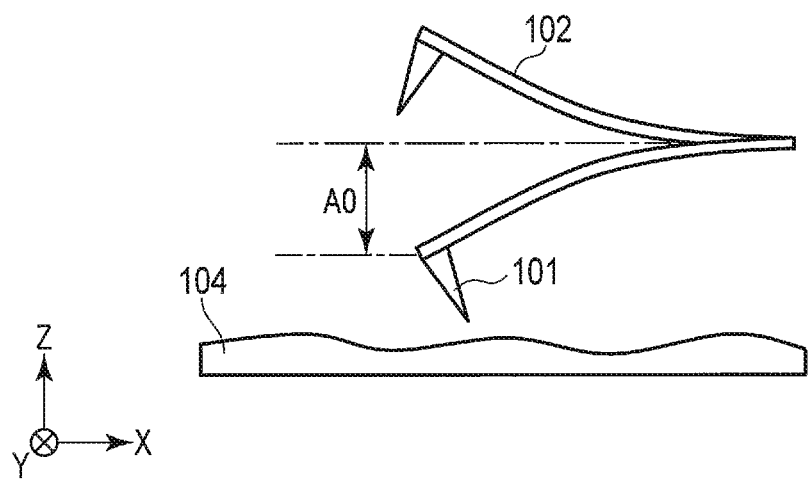
FIG. 4 shows the vibration state of the cantilever when the interaction between the probe and the sample is zero.
Figure 5:
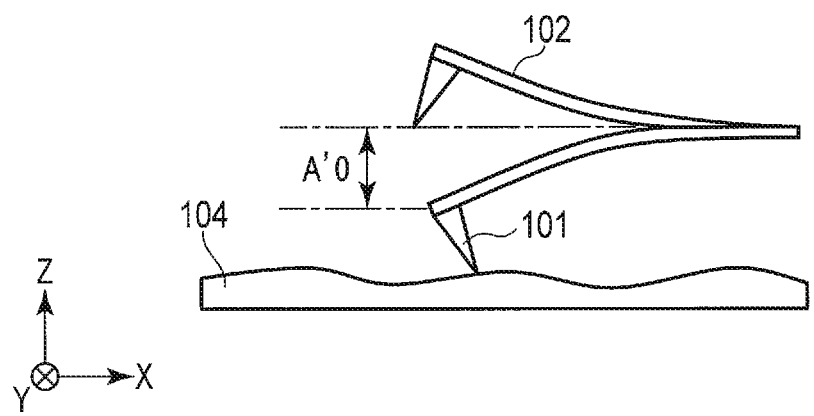
FIG. 5 shows the vibration state of the cantilever when the interaction between the probe and the sample is greater than zero.

FIGS. 4 and 5 show the relationship between the vibration state of the cantilever 102, for example, the magnitude of the vibration amplitude, and the interaction between the probe 101 and the sample 104.

FIG. 4 shows a case where the probe 101 and the sample 104 are spaced, namely, where the interaction between the probe 101 and the sample 104 is zero. In this case, the magnitude of the vibration amplitude of the cantilever 102 is A0.

FIG. 5 shows a case where the interaction between the probe 101 and the sample 104 is larger than zero. In this case, the magnitude of the vibration amplitude of the cantilever 102 is A'0.

The relationship between A0 and A'0 is A0>A'0. As the interaction between the probe 101 and the sample 104 increases, A'0 decreases.

Figure 6:
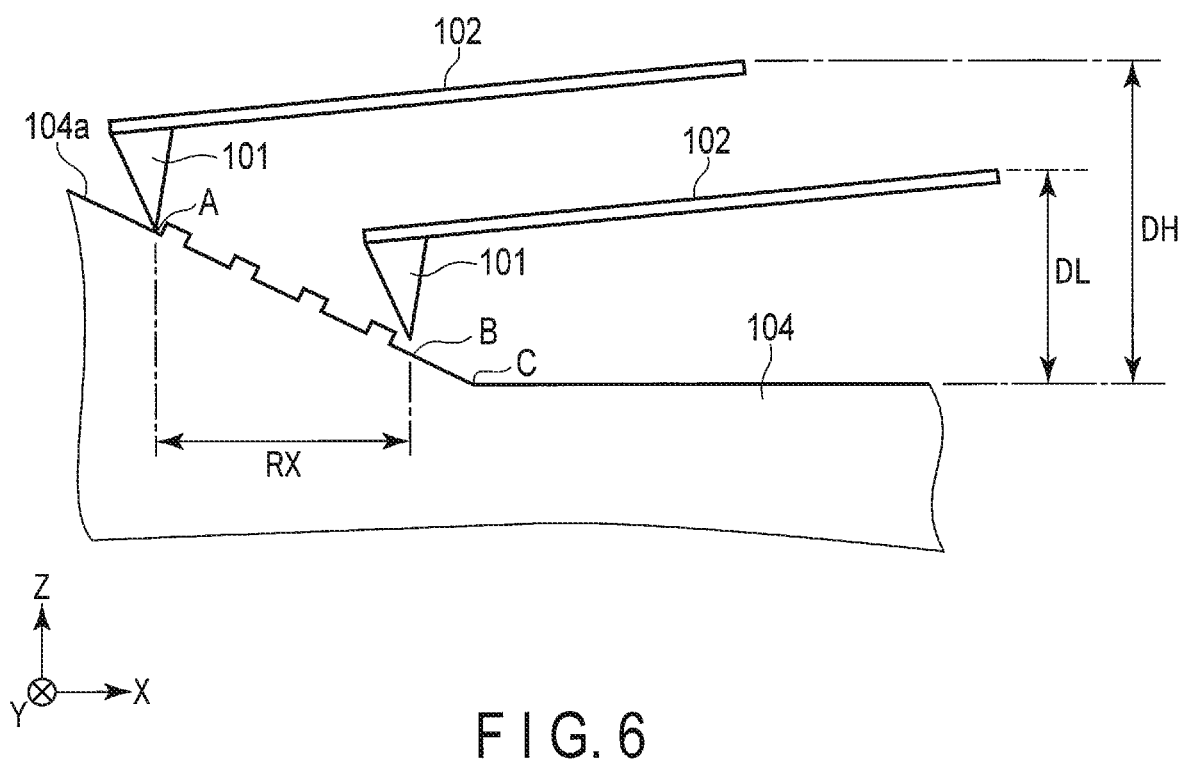
FIG. 6 shows the positional relationship between a sample whose surface is partially inclined with respect to the XY plane and the cantilever.
Figure 7:
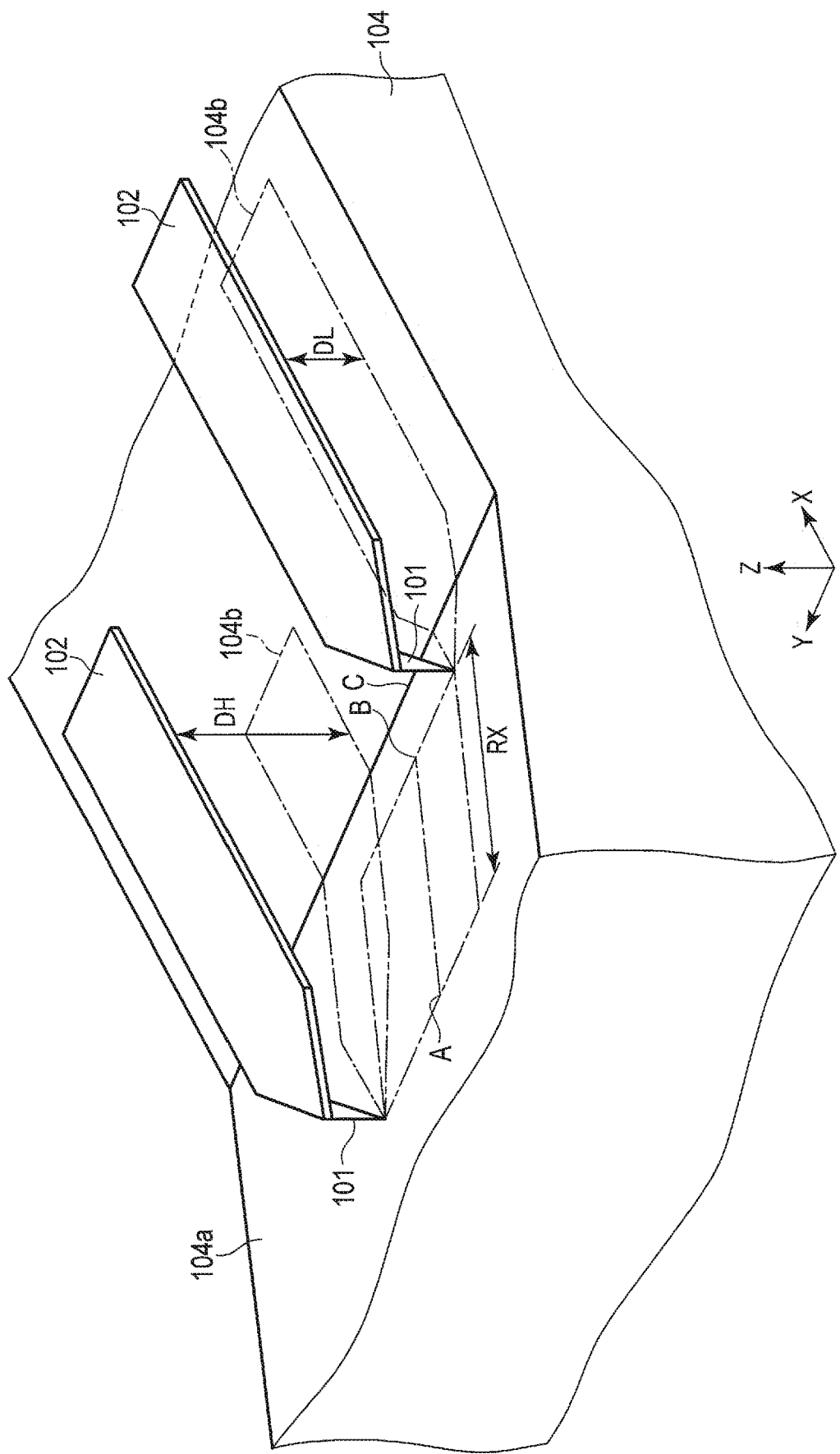
FIG. 7 is a perspective view showing a positional relationship between a sample whose surface is partially inclined with respect to the XY plane and the cantilever.
Figure 8:
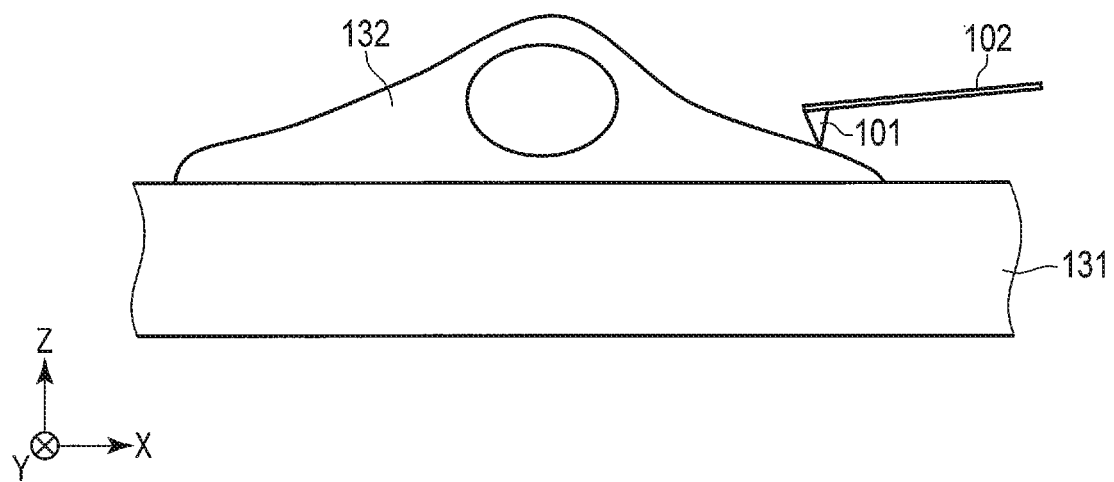
FIG. 8 shows a sample substrate and a cell sample cultured thereon.

FIGS. 6 and 7 show a positional relationship between the cantilever 102 and a sample 104 whose surface partially is partially inclined with respect to the XY plane. Such sample 104 whose surface is partially inclined with respect to the XY plane is formed by a combination of a sample substrate 131 (not shown in FIG. 1) arranged parallel to the XY plane and a cell sample 132 cultured thereon as shown in FIG. 8, for example.

In the sample 104 whose surface is partially inclined with respect to the XY plane, the range from a point A to a point B located on the inclined portion is set as a range RX for the raster scan along the X axis. In other words, the range from the point A to the point B is set as a range for acquiring the sample information along the X axis. In addition, the edge of the inclined portion on the +X side along the X axis is set as a point C. Furthermore, in the sample 104, assume that a sample surface 104a from the point C in the +X direction is generally parallel to the XY plane.

In this case, when the probe 101 is located at the point A of the sample 104, the distance between the cantilever 102 and the sample surface 104a is DH. When the probe 101 is located at the point B of the sample 104, the distance between the cantilever 102 and the sample surface 104a is DL. DH and DL have a relationship of DH>DL.

Incidentally, if the cantilever 102 is vibrated in the solution, an interaction in accordance with the viscosity of the solution acts between the cantilever 102 and the solution. The interaction between the cantilever 102 and the solution varies depending on the distance between the cantilever 102 and the sample surface 104a.

Specifically, if the distance between the cantilever 102 and the sample surface 104a decreases, the interaction acting between the cantilever 102 and the solution increases, so that the vibration state of the cantilever 102 changes; for example, the magnitude of the vibration amplitude decreases. On the contrary, if the distance between the cantilever 102 and the sample surface 104a increases, the interaction acting between the cantilever 102 and the solution decreases, so that the vibration state of the cantilever 102 changes; for example, the magnitude of the vibration amplitude increases.

Accordingly, at the point A of the sample 104, the interaction acting between the cantilever 102 and the solution decreases, so that the magnitude of the vibration amplitude increases. At the point B of the sample 104, the interaction acting between the cantilever 102 and the solution increases, so that the magnitude of the vibration amplitude decreases.

The interaction acting between the cantilever 102 and the solution varies depending on the area of the cantilever 102 in addition to the distance between the cantilever 102 and the sample surface 104a. That is, the interaction between the cantilever 102 and the solution varies depending on the volume of the solution that exists between the cantilever 102 and the portion 104b of the sample surface 104a that faces the cantilever 102. Therefore, the interaction between the cantilever 102 and the solution is obtained as an integral value of the interaction acting on each part of the cantilever 102.

As described above, change in the vibration state of the cantilever 102, for example, change in the change in the magnitude of the vibration amplitude, has two factors: the interaction between the probe 101 and the sample 104 and the interaction between the cantilever 102 and the solution. The interaction information includes not only information related to the interaction between the probe 101 and the sample 104 but also information related to the interaction between the cantilever 102 and the solution.

Specifically, the vibration state (interaction information), for example, a vibration amplitude, of the cantilever 102 when the probe 101 and the sample 104 are not in contact with each other is set to A0, and the desired vibration state (interaction reference information), for example, a vibration amplitude, of the cantilever 102 indicating the magnitude of the interaction between the probe 101 and the sample 104 is set to A1. In this case, the deviation information between the interaction information and the interaction reference information, namely, (A0−A1), indicates the interaction between the probe 101 and the sample 104. In the atomic force microscopes, while this (A0−A1), namely, the interaction between the probe 101 and the sample 104, is controlled to be constant, sample information is acquired.

However, the deviation information (A0−A1) includes not only information on the interaction between the probe 101 and the sample 104 but also information on the interaction between the cantilever 102 and the solution, which causes a problem that the interaction between the probe 101 and the sample 104 cannot be actually maintained constant.

Figure 9:
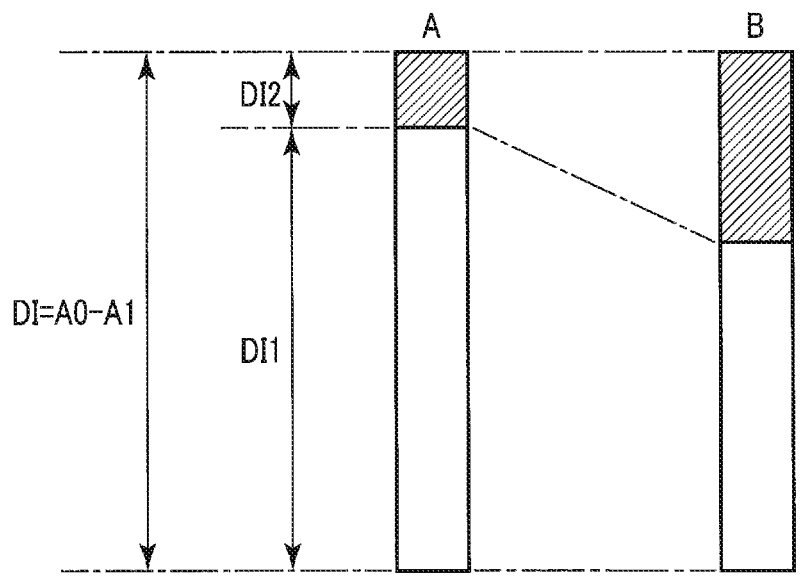
FIG. 9 shows the ratio between information on the interaction between the probe and the sample included in deviation information at a point A and a point B on the sample surface, and information on the interaction between the cantilever and the solution.

FIG. 9 is a bar graph showing the proportions of information DI1 on the interaction between the probe 101 and the sample 104 and information DI2 on the interaction between the cantilever 102 and the solution at the point A and the point B of the sample 104, which are included in the deviation information (DI=A0−A1). In FIG. 9, white parts of bars represent the information DI1 on the interaction between the probe 101 and the sample 104, and shaded parts of the bars represent the information DI2 on the interaction between the cantilever 102 and the solution.

At the point A, since the distance between the cantilever 102 and the sample surface 104a is large, the proportion of the information DI2 on the interaction between the cantilever 102 and the solution is small. On the other hand, at the point B, since the distance between the cantilever 102 and the sample surface 104a is small, the proportion of the information DI2 on the interaction between the cantilever 102 and the solution is large.

The atomic force microscope controls the magnitude of the signal of the deviation information (DI=A0−A1) to be constant. Accordingly, at the point A, the sample information is acquired with the interaction between the probe 101 and the sample 104 being large. On the other hand, at the point B, sample information is acquired with the interaction between the probe 101 and the sample 104 being small. This decreases the accuracy of acquiring the sample information.

Specifically, since the interaction between the probe 101 and the sample 104 is smaller at the point B than at the point A, the sample information at the point B displayed on the sample information display 115 is blurred (out of focus) compared with the sample information at the point A.

In order to solve the above problem, the atomic force microscope of the present embodiment includes the interaction control mechanism 105. In other words, the interaction control mechanism 105 has a function to solve the above problem. Furthermore, the interaction control mechanism 105 includes the inclination correction circuit 111, which solves the above problem.

The function of the interaction control mechanism 105 will be described below.

Figure 10:
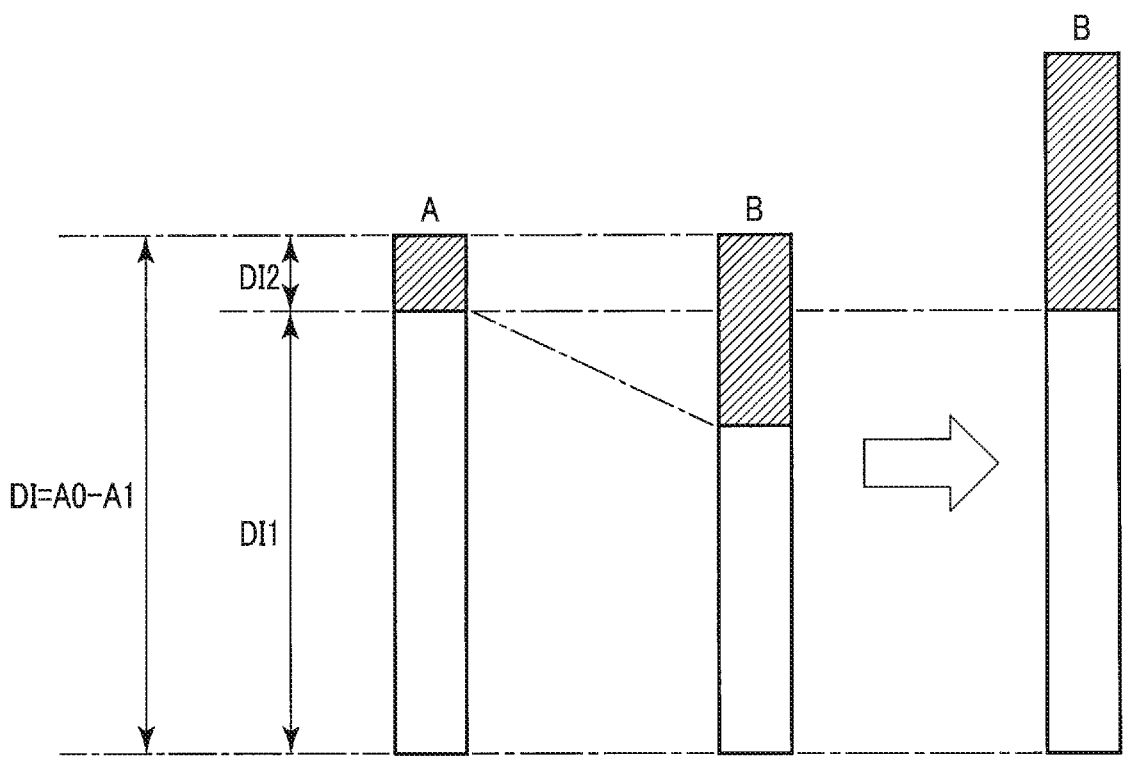
FIG. 10 shows the deviation information at the point A and the point B on the sample surface, and deviation information at the point B at which the magnitude of the signal is increased until the magnitude of the interaction information component between the probe and the sample at the point B matches the magnitude of the interaction information component between the probe and the sample at the point A.

In order to solve the above problem, the magnitudes of the components of the information DI1 on the interaction between the probe 101 and the sample 104 at the point A and the point B should be matched. Thereby, the sample information can be acquired with the interaction between the probe 101 and the sample 104 being constant at both of the point A and the point B. For this purpose, as shown in FIG. 10, the signal of the deviation information (DI=A0−A1) at the point B should be increased until the magnitude of the component of the information DI1 on the interaction between the probe 101 and the sample 104 at the point B matches the magnitude of the component of the information DI1 on the interaction between the probe 101 and the sample 104 at the point A. In other words, the interaction control mechanism 105 solves the above problem by increasing the signal of the deviation information (DI=A0−A1) at the point B.

That is, the interaction control mechanism 105 can control the interaction between the probe 101 and the sample 104 with high accuracy by changing the magnitude of the signal of the deviation information (A0−A1) in accordance with the inclination of the sample surface 104a with respect to the XY plane, specifically, based on correction information for correcting the change in the influence of the interaction between the cantilever 102 and the solution due to the inclination of the sample surface 104a with respect to the XY plane.

Here, the correction information includes inclination-related information related to the inclination of the sample surface 104a with respect to the XY plane, and information for performing an adjustment of the inclination-related information. The inclination-related information is, for example, inclination correction information (described later) generated based on inclination information of the sample surface 104a with respect to the XY plane. The information for performing the adjustment includes, for example, information for performing magnitude adjustment and offset addition. These will be described later.

Specifically, since the deviation information (A0−A1) is the deviation information between the interaction information (A0) and the interaction reference information (A1), in order to increase the signal of the deviation information (A0−A1), the signal of the interaction information (A0) should be increased, the signal of the interaction reference information (A1) should be decreased, or the signal of the interaction information (A0) should be increased and the signal of the interaction reference information (A1) should be decreased. Further, the vibration signal may be increased in order to increase the signal of the interaction information (A0). In order to decrease the signal of the deviation information (A0−A1), the signal of the interaction information (A0) should be decreased, the signal of the interaction reference information (A1) should be increased, or the signal of the interaction information (A0) should be decreased and the signal of the interaction reference information (A1) should be increased. Furthermore, the vibration signal may be decreased in order to decrease the signal of the interaction information (A0).

Therefore, the interaction control mechanism 105 can control the interaction between the probe 101 and the sample 104 with high accuracy by changing the magnitude of at least one of the vibration signal, the signal of the interaction information, and the signal of the interaction reference information, in accordance with the inclination of the sample surface 104a with respect to the XY plane, specifically, based on the correction information for correcting the change in the influence of the interaction between the cantilever 102 and the solution due to the inclination of the sample surface 104a with respect to the XY plane.

The interaction control mechanism 105 includes the inclination correction circuit 111 configured to change the magnitude of at least one of the vibration signal, the signal of the interaction information, and the signal of the interaction reference information, in order to control the interaction between the probe 101 and the sample 104 in accordance with the inclination of the sample surface 104a with respect to the XY plane.

Figure 11:
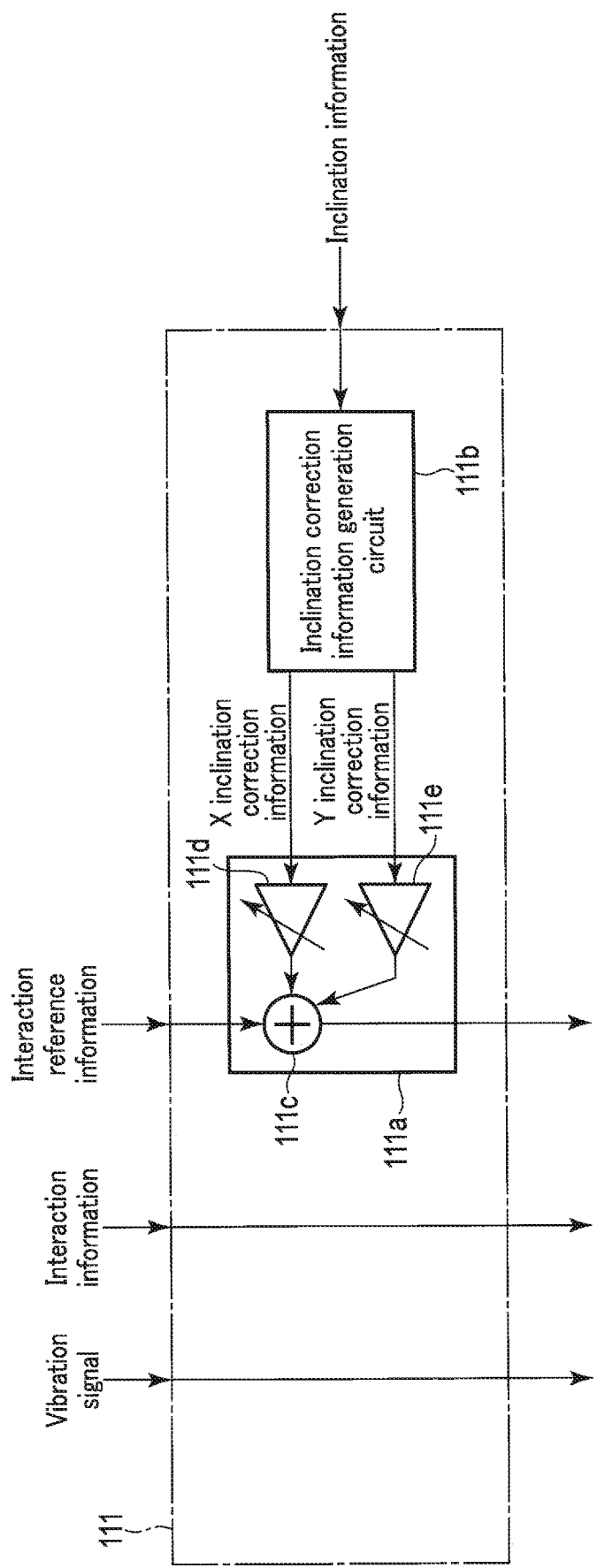
FIG. 11 shows a configuration of an inclination correction circuit configured to change the magnitude of a signal of interaction reference information.

FIG. 11 shows a configuration example of the inclination correction circuit 111 configured to change the magnitude of the signal of the interaction reference information. The inclination correction circuit 111 includes an inclination correction information generation circuit 111b configured to generate inclination correction information based on the inclination information of the sample surface 104a with respect to the XY plane output from the sample information acquisition circuit 114, and an adjustment circuit 111a configured to change the magnitude of the signal of the interaction reference information by operating the interaction reference information with the inclination correction information.

The inclination correction information generation circuit 111b generates inclination correction information based on the inclination information of the sample surface 104a with respect to the XY plane output from the sample information acquisition circuit 114, and then supplies the inclination correction information to the adjustment circuit 111a. This inclination correction information includes X inclination correction information related to the inclination of the sample surface 104a along the X axis and Y inclination correction information related to the inclination of the sample surface 104a along the Y axis. The X inclination correction information and the Y inclination correction information are supplied to the variable gain amplifier 111d and the variable gain amplifier 111e provided in the adjustment circuit 111a, respectively.

Here, the X inclination correction information and the Y inclination correction information will be described with reference to FIGS. 12-14.

Figure 12:
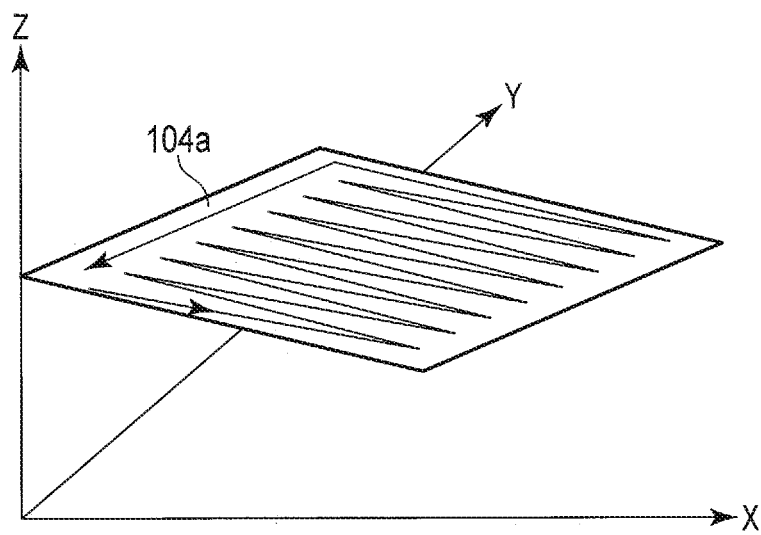
FIG. 12 shows the sample surface in an area for a raster scan.

FIG. 12 shows a sample surface 104a in an area for the raster scan, in other words, an area for acquiring the sample information. An arrow of the raster scan shown in FIG. 12 represents the movement of the raster scan between the probe 101 provided on the cantilever 102 and the sample 104 relative to each other shown in FIG. 2. Although the raster scan by the raster scan control mechanism 113 is performed across the XY plane, since the probe 101 and the sample 104 are scanned relative to each other along the Z axis, the raster scan with respect to the sample 104 is performed across the sample surface 104a as a result.

Figure 13:
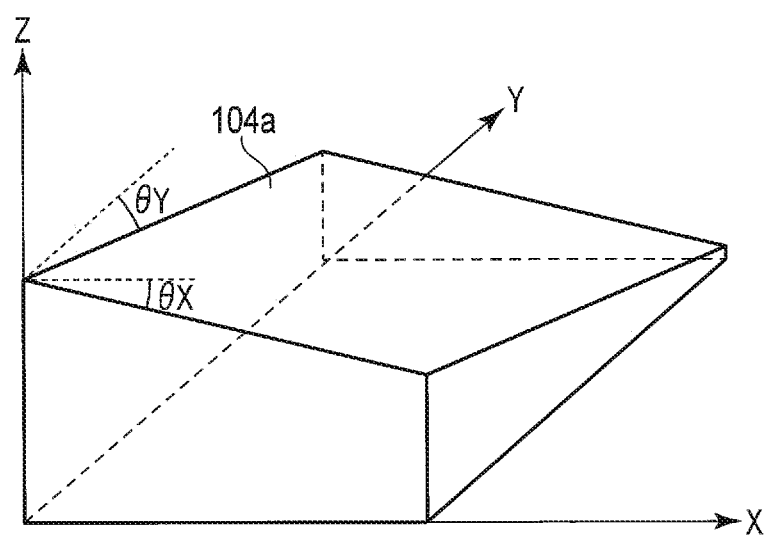
FIG. 13 shows the inclination of the sample surface shown in FIG. 12 with respect to an X axis and the inclination with respect to a Y axis.

As shown in FIG. 13, the sample surface 104a shown in FIG. 12 has a plus-downward inclination of θX degrees with respect to the X axis and θY degrees with respect to the Y axis. Here, the plus-downward inclination means an inclination such that the Z value decreases as the X value increases and the Z value decreases as the Y value increases.

Figure 14:
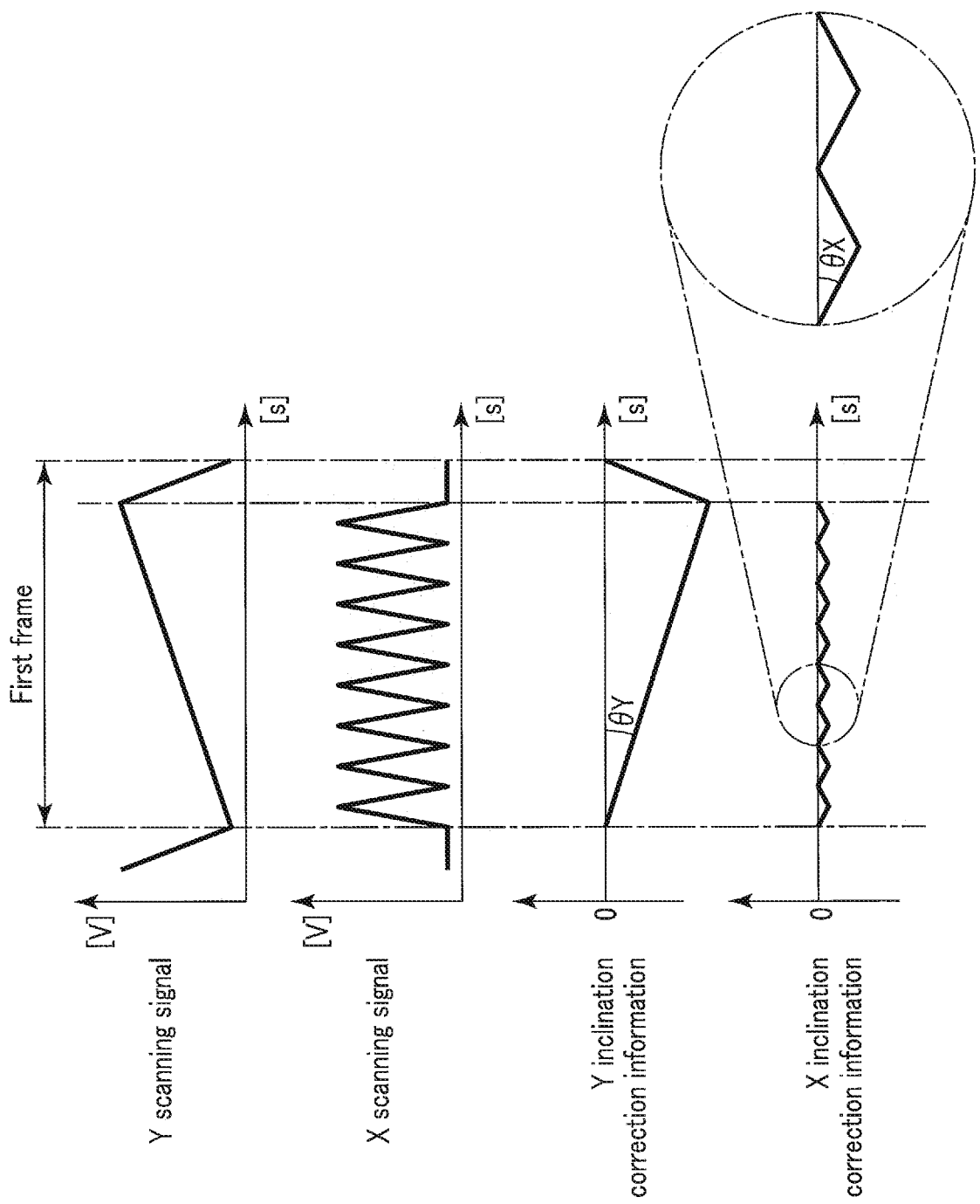
FIG. 14 shows an X scanning signal and a Y scanning signal, a signal of X inclination correction information, and a signal of Y inclination correction information.

In this case, as shown in FIG. 14, the X inclination correction information is information indicating the movement in the XZ plane of the scanning line with respect to the sample surface 104a shown in FIG. 12, which is synchronized with the X scanning signal (namely the X scan), and the Y inclination correction information is information indicating the movement in the YZ plane of the scanning line with respect to the sample surface 104a shown in FIG. 12, which is synchronized with the Y scanning signal (namely the Y scan).

Referring again to FIG. 11, the X inclination correction information and the Y inclination correction information are respectively input to the variable gain amplifier 111d and the variable gain amplifier 111e included in the adjustment circuit 111a, respectively, and the magnitudes of the signal of the X inclination correction information and the signal of the Y inclination correction information are adjusted in the variable gain amplifier 111d and the variable gain amplifier 111e.

The influence of the interaction between the cantilever 102 and the solution varies depending on the shape of the sample 104 other than the region where the sample information is acquired, the viscosity of the solution, the shape of the cantilever 102, the length of the probe 101, etc. The variable gain amplifier 111d and the variable gain amplifier 111e are provided for coping with this variation, and enable an operator to optimally adjust the magnitudes of the signal of the X inclination correction information and the signal of the Y inclination correction information while checking the sample information displayed on the sample information display 115. The operation to optimally adjust may be automatically performed by an information recognition program such as AI (Artificial Intelligence) or deep learning based on the sample information acquired by the sample information acquisition circuit 114.

In other words, the magnitudes of the signal of the X inclination correction information and the signal of the Y inclination correction information are adjusted based on information input to the inclination correction circuit 111 by an operator or an information recognition program.

Both the signal of the X inclination correction information and the signal of the Y inclination correction information having adjusted magnitudes are input to the addition circuit 111c. The addition circuit 111c adds the signal of the X inclination correction information and the signal of the Y inclination correction information having adjusted magnitudes to the signal of the interaction reference information. In this manner, the adjustment circuit 111a adds the signal of the interaction reference information to the signal of the inclination correction information composed of the signal of the X inclination correction information and the signal of the Y inclination correction information having adjusted magnitudes, thereby changing the magnitude of the signal of the interaction reference information.

Specifically, the signal of the deviation information (A0–A1) needs to be larger on the lower side of the inclination than on the upper side of the inclination. For this purpose, the adjustment circuit 111a makes the signal of the interaction reference information (A1) on the lower side of the inclination smaller than the signal of the interaction reference information (A1) on the upper side of the inclination. Since the magnitude of the signal of the inclination correction information is smaller on the lower side of the inclination than on the upper side of the inclination, the signal of the interaction reference information (A1) on the lower side of the inclination can be made smaller than the signal of the interaction reference information (A1) on the upper side of the inclination by adding the signal of the inclination correction information to the signal of the interaction reference information (A1).

The adjustment circuit 111a provided in the inclination correction circuit 111 shown in FIG. 11 performs the addition operation using the addition circuit 111c as an example in order to change the magnitude of the signal of the interaction reference information. The operation manner is not limited to the addition operation as long as the magnitude of the signal of the interaction reference information can be changed in accordance with the inclination of the sample surface 104a with respect to the XY plane.

The inclination correction circuit 111 shown in FIG. 11 is configured to change the magnitude of the signal of the interaction reference information as an example, but the configuration is not limited thereto. The inclination correction circuit 111 only needs to be configured to change the magnitude of at least one of the vibration signal, the signal of the interaction information, and the signal of the interaction reference information. Regarding the vibration signal, the signal of the interaction information, and the signal of the interaction reference information, a direction of change in the vibration signal and the signal of the interaction information is opposite to a direction of change in the signal of the interaction reference information.

Figure 15:
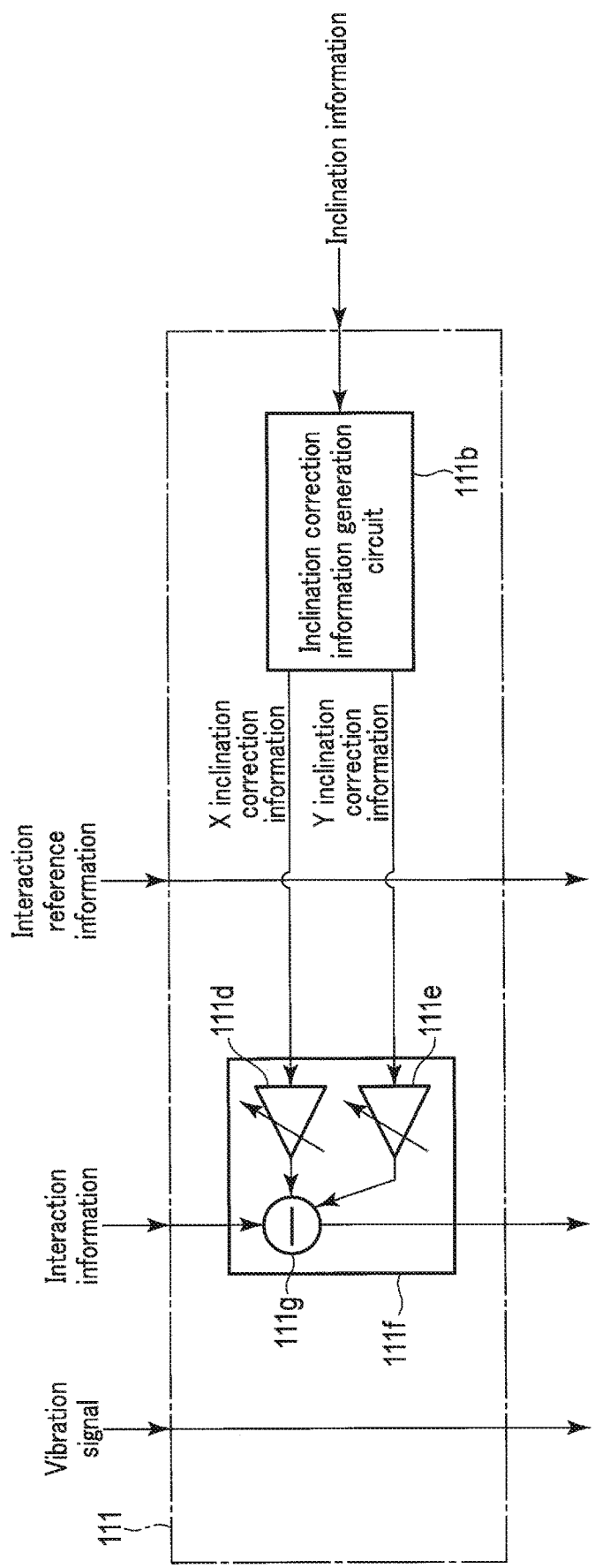
FIG. 15 shows a configuration of an inclination correction circuit configured to change the magnitude of a signal of an interaction information.

FIG. 15 shows a configuration example of the inclination correction circuit 111 configured to change the magnitude of the signal of the interaction information. The inclination correction circuit 111 shown in FIG. 15 includes an adjustment circuit 111f configured to change the magnitude of the signal of the interaction information by operating the interaction information with the inclination correction information. The adjustment circuit 111f has a configuration including a subtraction circuit 111g in place of the addition circuit 111c, in comparison with the adjustment circuit 111a shown in FIG. 11. The subtraction circuit 111g subtracts the signal of the X inclination correction information and the signal of the Y inclination correction information having adjusted magnitudes from the signal of the interaction information. The adjustment circuit 111f changes the magnitude of the signal of the interaction information by such subtraction operation of the subtraction circuit 111g.

Specifically, the signal of the deviation information (A0–A1) needs to be larger on the lower side of the inclination than on the upper side of the inclination. For this purpose, the adjustment circuit 111f makes the signal of the interaction information (A0) on the lower side of the inclination larger than the signal of the interaction information (A0) on the upper side of the inclination. Since the magnitude of the signal of the inclination correction information is smaller on the lower side of the inclination than on the upper side of the inclination, the signal of the interaction information (A0) on the lower side of the inclination can be made larger than the signal of the interaction information (A0) on the upper side of the inclination by subtracting the signal of the inclination correction information having an adjusted magnitude from the signal of the interaction information (A0). The adjustment circuit 111f provided in the inclination correction circuit 111 shown in FIG. 15 performs the subtraction operation using the subtraction circuit 111g as an example in order to change the magnitude of the signal of the interaction information. The operation manner is not limited to the subtraction operation as long as the magnitude of the signal of the interaction information can be changed in accordance with the inclination of the sample surface 104a with respect to the XY plane.

Figure 16:
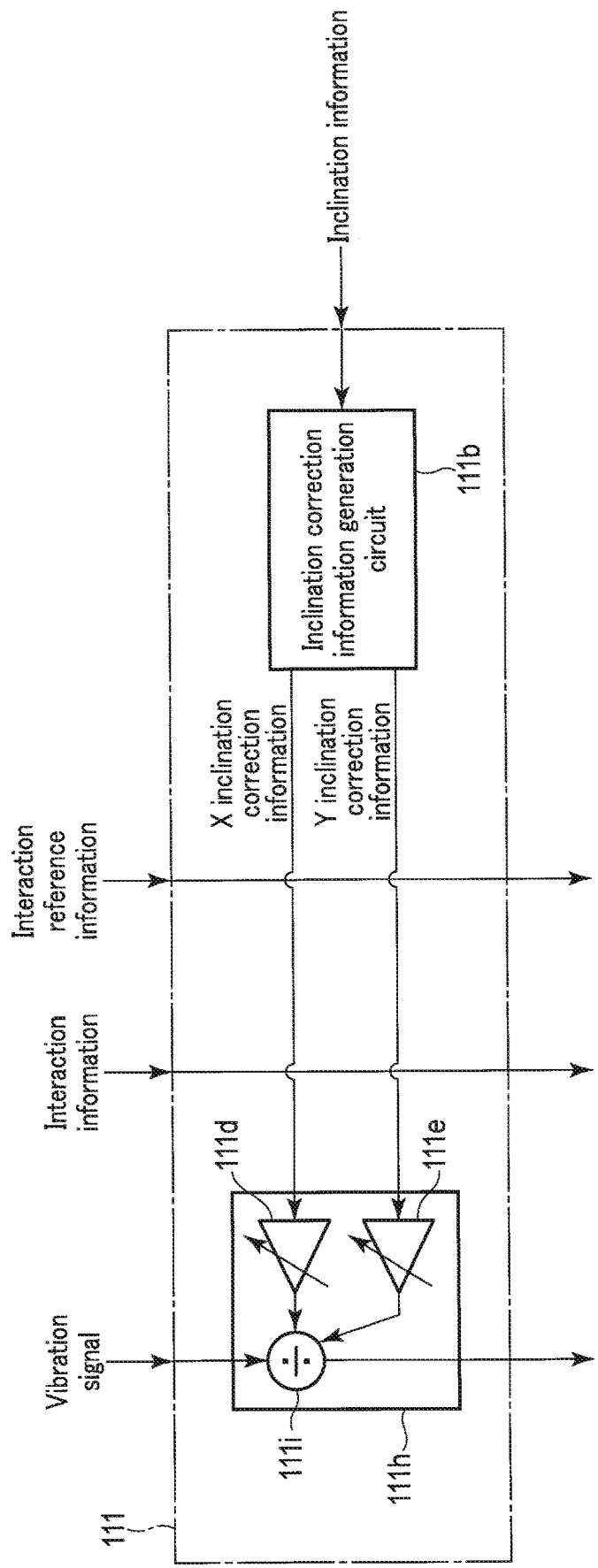
FIG. 16 shows a configuration of an inclination correction circuit configured to change the magnitude of a vibration signal.

FIG. 16 shows a configuration example of the inclination correction circuit 111 configured to change the magnitude of the vibration signal. Since the vibration signal is an AC signal, changing the magnitude of the vibration signal means changing the magnitude of the amplitude of the vibration signal. The inclination correction circuit 111 shown in FIG. 16 includes an adjustment circuit 111a configured to change the magnitude of the vibration signal by operating the vibration signal with the inclination correction information. The adjustment circuit 111h includes a division circuit 111i. First, the division circuit 111i normalizes the signal of the X inclination correction information and the signal of the Y inclination correction information having adjusted magnitudes as shown in FIG. 17 by processing such as offset addition. Next, the division circuit 111i divides the vibration signal by the normalized signal of the X inclination correction information and the normalized signal of the Y inclination correction information. The adjustment circuit 111h changes the magnitude of the vibration signal by such operation of the division circuit 111i.

Specifically, the signal of the deviation information (A0–A1) needs to be larger on the lower side of the inclination than on the upper side of the inclination. For this purpose, the adjustment circuit 111h increases the vibration signal in order to cause the signal of the interaction information (A0) on the lower side of the inclination to be larger than the signal of the interaction information (A0) on the upper side of the inclination. Since the magnitude of the normalized signal of the inclination correction information is smaller on the lower side of the inclination than on the upper side of the inclination, the vibration signal on the lower side of the inclination can be made larger than the vibration signal on the upper side of the inclination by dividing the vibration signal by the normalized signal of the inclination correction information.

The adjustment circuit 111h provided in the inclination correction circuit 111 shown in FIG. 16 performs the division operation using a division circuit 111i as an example in order to change the magnitude of the vibration signal, namely, the magnitude of the amplitude of the vibration signal. The operation manner is not limited to the division operation as long as the magnitude of the vibration signal can be changed accordance with the inclination of the sample surface 104a with respect to the XY plane.

As described above, the atomic force microscope in accordance with the present embodiment includes the interaction control mechanism, so that the interaction generated between the probe and the sample can be controlled with good accuracy in accordance with the inclination of the sample surface with respect to the XY plane. Thereby, even if the sample surface is inclined with respect to the XY plane, highly accurate sample information can be acquired.

Furthermore, in the atomic force microscope of the present embodiment, since the interaction control mechanism 105 includes the inclination correction circuit 111, the interaction between the probe and the sample can be accurately controlled by changing the magnitude of at least one of the vibration signal, the signal of the interaction information, and the signal of the interaction reference information based on the inclination information of the sample surface 104a with respect to the XY plane output from the sample information acquisition circuit 114. Thereby, even if the sample surface 104a is inclined with respect to the XY plane, highly accurate sample information can be acquired.

Figure 18:
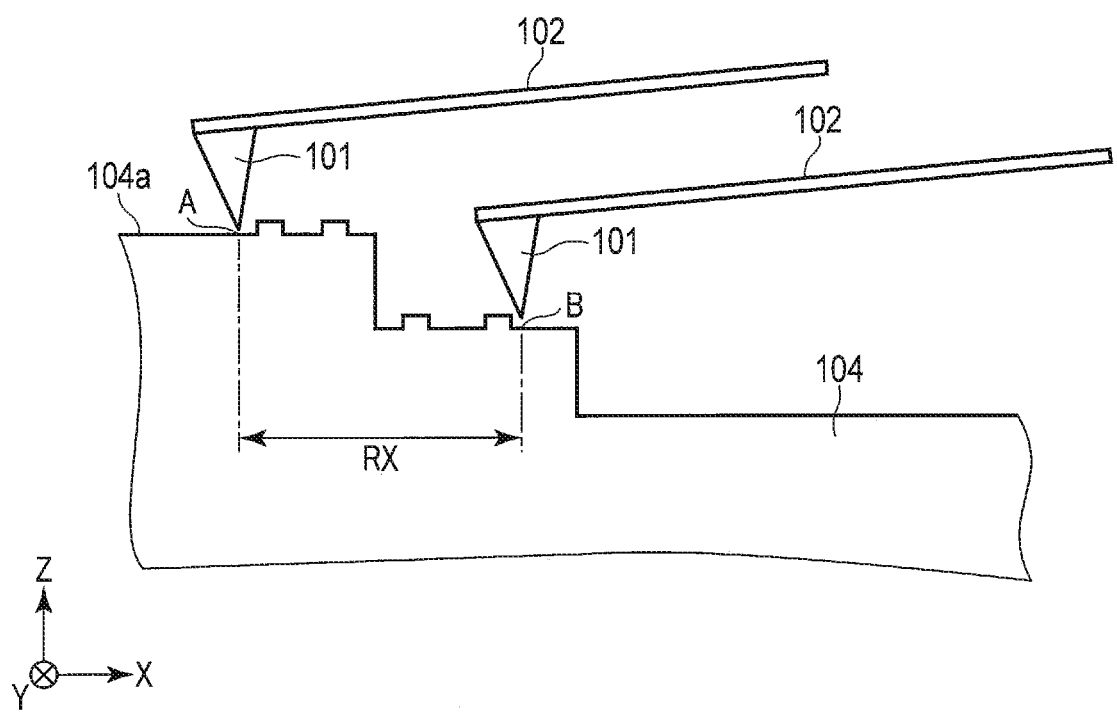
FIG. 18 shows a sample in which the inclination of the sample surface with respect to the XY plane is in a stepped shape.

Furthermore, in the present embodiment, a similar effect can be obtained even if the inclined portion of the sample surface 104a with respect to the XY plane has a stepped shape (steps shape) as shown in FIG. 18. In this case, the X inclination correction information and the Y inclination correction information have a stepped shape (steps shape) similar to the stepped shape (steps shape) of the sample surface 104a. If the step of the stepped shape (steps shape) of the sample surface 104a is sufficiently small with respect to the length of the probe 101, the X inclination correction information and the Y inclination correction information may be approximated as an inclined surface of the sample surface 104a with respect to the XY plane.

Further, even if the inclined portion of the sample surface 104a with respect to the XY plane is a curved surface, since a part of the curved surface can be locally approximated as an inclined surface, a similar effect can be obtained.

Second Embodiment

A second embodiment will be described below with reference to FIGS. 19 to 22.

Figure 19:
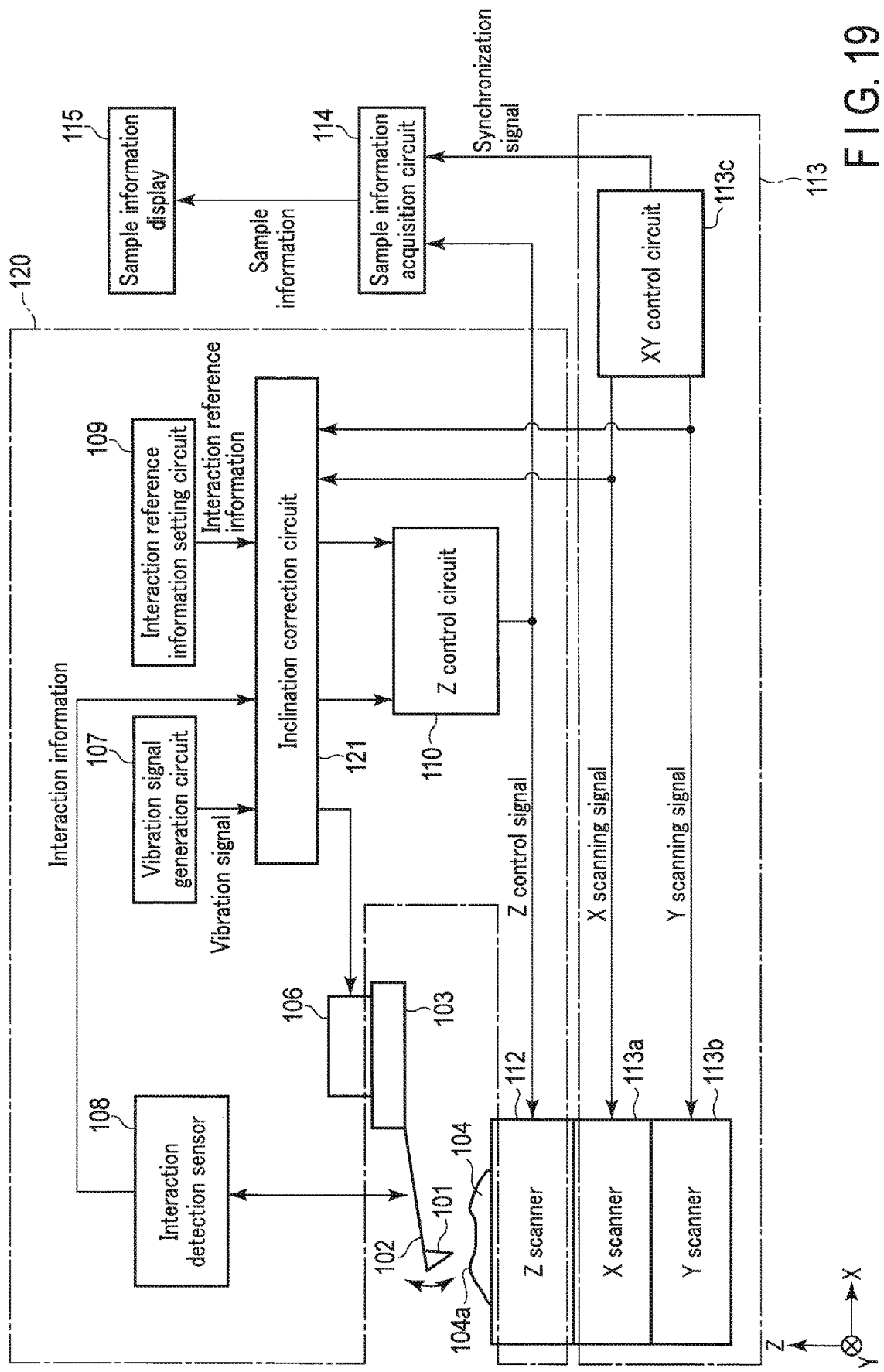
FIG. 19 shows a configuration of an atomic force microscope according to the second embodiment.

FIG. 19 shows a configuration of an atomic force microscope according to the second embodiment. The atomic force microscope of the present embodiment is different from the first embodiment in the interaction control mechanism. Specifically, the inclination correction circuit is different. In FIG. 19, members having the same reference numerals as those of the atomic force microscope shown in FIG. 1 of the first embodiment are similar members, and detailed description thereof is omitted here. The following descriptions will be provided with an emphasis on the difference. Namely, the parts not described below are the same as those in the first embodiment.

As shown in FIG. 19, an interaction control mechanism 120 includes an inclination correction circuit 121. The inclination correction circuit 121 receives an X scanning signal and a Y scanning signal generated by the XY control circuit 113c, in place of the inclination information of the sample surface 104a with respect to the XY plane output from the sample information acquisition circuit 114.

That is, the interaction control mechanism 105 can control the interaction between the probe 101 and the sample 104 with high accuracy by changing the magnitude of the signal of the deviation information (A0–A1) in accordance with the inclination of the sample surface 104a with respect to the XY plane, specifically, based on the correction information for correcting the change in the influence of the interaction between the cantilever 102 and the solution due to the inclination of the sample surface 104a with respect to the XY plane.

Here, the correction information includes the X scanning signal, the Y scanning signal, and information for adjusting the X scanning signal and the Y scanning signal. Adjustments performed on the X scanning signal and the Y scanning signal include magnitude adjustment, offset addition, and signal inversion.

The interaction control mechanism 105 includes an inclination correction circuit 121 configured to change the magnitude of at least one of the vibration signal, the signal of the interaction information, and the signal of the interaction reference information, in order to control the interaction between the probe 101 and the sample 104 in accordance with the inclination of the sample surface 104a with respect to the XY plane.

FIG. 20 shows a configuration example of the inclination correction circuit 121 configured to change the magnitude of the signal of the interaction reference information. As shown in FIG. 20, the inclination correction circuit 121 includes an adjustment circuit 121a configured to change the magnitude of the signal of the interaction reference information by operating the signal of the interaction reference information with an X scanning signal and a Y scanning signal.

The X scanning signal and the Y scanning signal are input to the variable gain amplifier 121d and the variable gain amplifier 121e provided in the adjustment circuit 121a, respectively. The variable gain amplifier 121d and the variable gain amplifier 121e are not only capable of adjusting the magnitudes of the X scanning signal and the Y scanning signal, but also capable of performing offset addition and signal inversion of the X scanning signal and the Y scanning signal.

The influence of the interaction between the cantilever 102 and the solution varies depending on the shape of the sample 104 other than the region where the sample information is acquired, the viscosity of the solution, the shape of the cantilever 102, the length of the probe 101, etc. The variable gain amplifier 121d and the variable gain amplifier 121e are provided for coping with this variation, and enable an operator to optimally perform the magnitude adjustment, the offset addition, and the signal inversion of the X scanning signal and the Y scanning signal, while checking the sample information displayed on the sample information display 115. The operation to optimally perform the magnitude adjustment, the offset addition, and the signal inversion may be automatically performed by an information recognition program such as AI (Artificial Intelligence) or deep learning based on the sample information acquired by the sample information acquisition circuit 114.

In other words, the magnitude adjustment, the offset addition, and the signal inversion of the X scanning signal and the Y scanning signal are performed based on information input to the inclination correction circuit 111 by an operator or an information recognition program. Here, "the magnitude adjustment, the offset addition, and the signal inversion . . . are performed" means, of course, that those operations are performed as necessary, and includes cases where those operations, for example signal inversion, are not performed.

Both the X scanning signal and the Y scanning signal that have undergone the magnitude adjustment, the offset addition, and the signal inversion are input to the addition circuit 121c. The addition circuit 121c adds the X scanning signal and the Y scanning signal, which have undergone the magnitude adjustment, the offset addition, and the signal inversion, to the signal of the interaction reference information. In this way, the adjustment circuit 121a changes the magnitude of the signal of the interaction reference information by adding the signal of the interaction reference information with the X scanning signal and the Y scanning signal, which have undergone the magnitude adjustment, the offset addition, and the signal inversion.

Specifically, the signal of the deviation information (A0-A1) needs to be larger on the lower side of the inclination than on the upper side of the inclination. For this purpose, the adjustment circuit 121a makes the signal of the interaction reference information (A1) on the lower side of the inclination smaller than the signal of the interaction reference information (A1) on the upper side of the inclination.

For example, assume that the sample surface 104a is inclined plus-downward with respect to the X axis and the Y axis as shown in FIGS. 12 and 13. In this case, in the first embodiment, the X inclination correction information and the Y inclination correction information are as shown in FIG. 14, but in the atomic force microscope of the present embodiment, the X scanning signal and the Y scanning signal are used in place of the X inclination correction information and the Y inclination correction information used in the first embodiment. This is because the X scanning signal and the Y scanning signal shown in FIG. 3 respectively have similar waveforms to the X inclination correction information and the Y inclination correction information shown in FIG. 14, and the X scanning signal and the Y scanning signal can respectively replace the X inclination correction information and the Y inclination correction information used in the first embodiment if the magnitude adjustment, the offset addition, and the signal inversion are performed on the X scanning signal and the Y scanning signal shown in FIG. 3.

In other words, the X scanning signal and the Y scanning signal can be regarded as inclination-related information that is related to the inclination of the sample surface 104a with respect to the XY plane.

In this manner, the adjustment circuit 121a performs the magnitude adjustment, the offset addition, and the signal inversion to the X scanning signal and the Y scanning signal shown in FIG. 3, so as to transform the X scanning signal and the Y scanning signal into the waveforms shown in FIG. 14. Then, the adjustment circuit 121a adds the X scanning signal and the Y scanning signal, which have undergone the magnitude adjustment, the offset addition, and the signal inversion, to the signal of the interaction reference information (A1), thereby making the signal of the interaction reference information (A1) on the lower side of the inclination smaller than the signal of the interaction reference information (A1) on the upper side of the inclination.

The adjustment circuit 121a provided in the inclination correction circuit 121 shown in FIG. 20 performs the addition operation using the addition circuit 121c as an example in order to change the magnitude of the signal of the interaction reference information. The adjustment circuit 121a may perform various operations, not limited to the addition operation, as long as the magnitude of the signal of the interaction reference information can be changed according with the inclination of the sample surface 104a with respect to the XY plane. The adjustment circuit 121a can perform the magnitude adjustment, the offset addition, and the signal inversion to the X scanning signal and the Y scanning signal shown in FIG. 3. Various operations, not limited to the addition operation, can be performed by combination with such signal processing.

The inclination correction circuit 121 shown in FIG. 20 is configured to change the magnitude of the signal of the interaction reference information as an example, but the configuration is not limited thereto. The inclination correction circuit 121 only needs to be configured to change the magnitude of at least one of the vibration signal, the signal of the interaction information, and the signal of the interaction reference information. Regarding the vibration signal, the signal of the interaction information, and the signal of the interaction reference information, a direction of change in the vibration signal and the signal of the interaction information is opposite to a direction of change in the signal of the interaction reference information.

FIG. 21 shows a configuration example of the inclination correction circuit 121 configured to change the magnitude of the signal of the interaction information. The inclination correction circuit 121 shown in FIG. 21 includes an adjustment circuit 121f configured to change the magnitude of the signal of the interaction information by operating the signal of the interaction information with the X scanning signal and the Y scanning signal. The adjustment circuit 121f includes an addition circuit 121g. The addition circuit 121g adds the signal of the interaction information to the X scanning signal and the Y scanning signal that have undergone the magnitude adjustment and the offset addition. The adjustment circuit 121f changes the magnitude of the signal of the interaction information by such an addition operation of the addition circuit 121g.

Specifically, the signal of the deviation information (A0-A1) needs to be larger on the lower side of the inclination than on the upper side of the inclination. For this purpose, the adjustment circuit 121f makes the signal of the interaction information (A0) on the lower side of the inclination larger than the signal of the interaction information (A0) on the upper side of the inclination.

The adjustment circuit 121f performs the magnitude adjustment and the offset addition to the X scanning signal and the Y scanning signal shown in FIG. 3, but does not perform signal inversion. Then, the adjustment circuit 121f adds the X scanning signal and the Y scanning signal that have undergone the magnitude adjustment and the offset addition to the signal of the interaction information (A0), thereby making the signal of the interaction reference information (A1) on the lower side of the inclination larger than the signal of the interaction reference information (A1) on the upper side of the inclination.

The adjustment circuit 121f provided in the inclination correction circuit 121 shown in FIG. 21 performs the addition operation using the addition circuit 121g as an example in order to change the magnitude of the signal of the interaction information. The adjustment circuit 121f may perform various operations, not limited to the addition operation, as long as the magnitude of the signal of the interaction information can be changed according with the inclination of the sample surface 104a with respect to the XY plane. The adjustment circuit 121f is capable of performing the magnitude adjustment, the offset addition, and the signal inversion to the X scanning signal and the Y scanning signal shown in FIG. 3. Various operations, not limited to the addition operation, can be performed by a combination with the signal processing.

Figure 23:
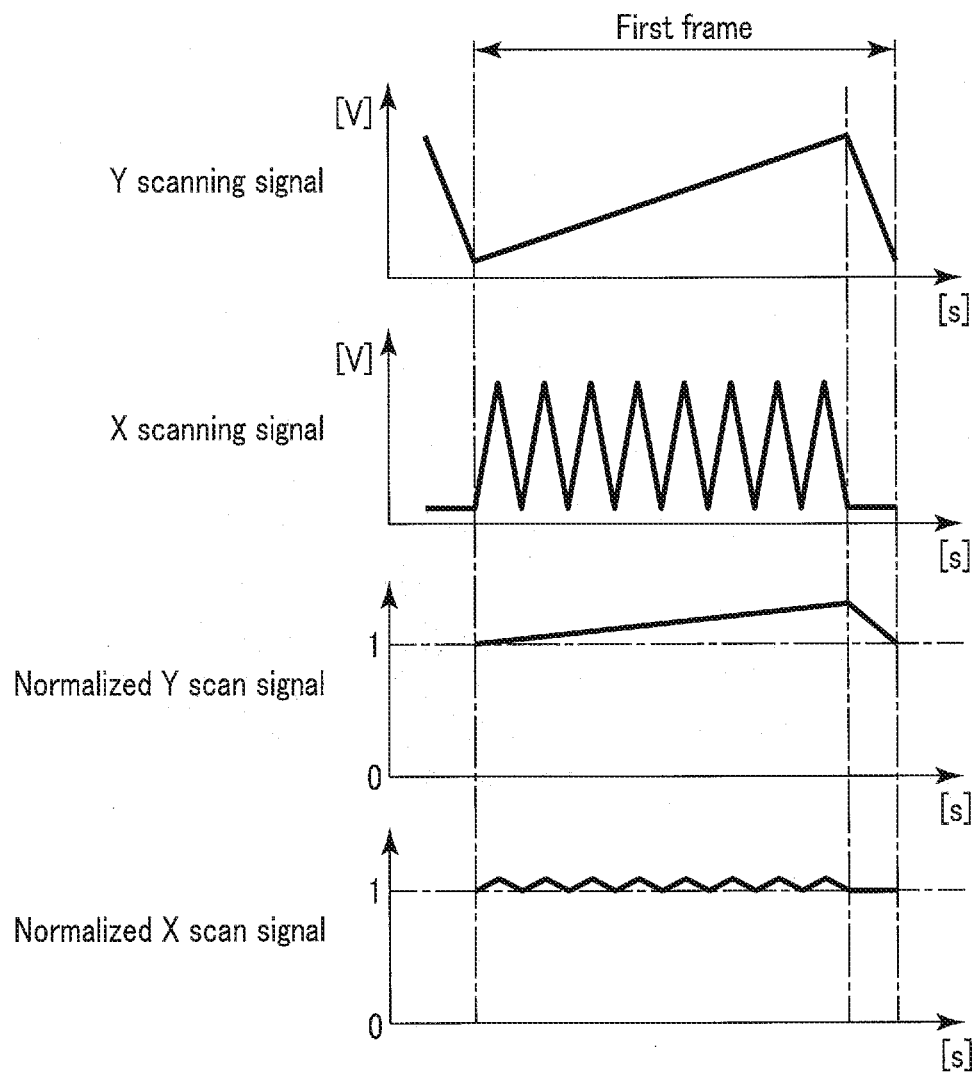
FIG. 23 shows an X scanning signal and a Y scanning signal, and a normalized X scanning signal and a normalized Y scanning signal.

FIG. 22 shows a configuration example of the inclination correction circuit 121 configured to change the magnitude of the vibration signal. Since the vibration signal is an AC signal, changing the magnitude of the vibration signal means changing the magnitude of the amplitude of the vibration signal. The inclination correction circuit 121 shown in FIG. 22 includes an adjustment circuit 121h configured to change the magnitude of the vibration signal by operating the vibration signal with the X scanning signal and the Y scanning signal. The adjustment circuit 121h includes a multiplication circuit 121i. First, the multiplication circuit 121i normalizes the X scanning signal and the Y scanning signal that have adjusted magnitudes as shown in FIG. 23 by processing such as offset addition. Next, the multiplication circuit 121i multiplies the vibration signal by the normalized X scanning signal and the Y scanning signal. The adjustment circuit 121h changes the magnitude of the vibration signal by such operation of the multiplication circuit 121i.

Specifically, the signal of the deviation information (A0−A1) needs to be larger on the lower side of the inclination than on the upper side of the inclination. For this purpose, the adjustment circuit 121h increases the vibration signal by multiplying the vibration signal by the X scanning signal and the Y scanning signal that have undergone the magnitude adjustment and the offset addition, so as to make the signal of the interaction information (A0) on the lower side of the inclination larger than the signal of the interaction information (A0) on the upper side of the inclination.

The adjustment circuit 121h provided in the inclination correction circuit 121 shown in FIG. 22 performs the multiplication operation using a multiplication circuit 121i as an example in order to change the magnitude of the vibration signal, namely, the magnitude of the amplitude of the vibration signal. Various operations, not limited to the multiplication operation, may be performed as long as the magnitude of the vibration signal can be changed. The adjustment circuit 121h is capable of performing the magnitude adjustment, the offset addition, and the signal inversion to the X scanning signal and the Y scanning signal shown in FIG. 3. Various operations, not limited to the multiplication operation, can be performed by a combination with such signal processing.

As described above, the atomic force microscope of the present embodiment includes the interaction control mechanism similarly to the first embodiment, so that the interaction generated between the probe and the sample can be controlled with good accuracy in accordance with the inclination of the sample surface 104a with respect to the XY plane. Thereby, even if the sample surface is inclined with respect to the XY plane, highly accurate sample information can be acquired.

Further, in the atomic force microscope of the present embodiment, the interaction control mechanism comprises the inclination correction circuit. This enables the atomic force microscope to control the interaction between the probe and the sample with good accuracy by changing the magnitude of at least one of the vibration signal, the signal of the interaction information, and the signal of the interaction reference information, in accordance with the inclination of the sample surface 104a with respect to the XY plane, specifically, based on correction information for correcting the change in the influence of the interaction between the cantilever 102 and the solution caused by the inclination of the sample surface 104a with respect to the XY plane, which is input to the inclination correction circuit 111. Thereby, even if the sample surface is inclined with respect to the XY plane, highly accurate sample information can be acquired.

Furthermore, the atomic force microscope of the present embodiment has a simpler configuration than that of the first embodiment, but can obtain effects similar to those of the first embodiment.

Furthermore, in the present embodiment, if the step of the stepped shape (steps shape) of the sample surface 104a is sufficiently small with respect to the length of the probe 101, since the inclination-related information, namely, the X scanning signal and the Y scanning signal, can be approximated as an inclined surface of the sample surface 104a with respect to the XY plane, a similar effect can be obtained even if the inclined portion of the sample surface 104a with respect to the XY plane has a stepped shape (steps shape) as shown in FIG. 18.

Further, even if the inclined portion of the sample surface 104a with respect to the XY plane is a curved surface, since a part of the curved surface can be locally approximated as an inclined surface, a similar effect can be obtained.

In the above embodiments, the fluid is described as a solution. However, the atomic force microscope according to each embodiment may be applied to sample observation in any fluid that interacts with the probe, such as a liquid or gas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An atomic force microscope comprising;
   a raster scan control mechanism configured to perform a raster scan between a cantilever having a probe at a free end and a sample relative to each other across an XY plane in a fluid;
   an interaction control mechanism configured to vibrate the cantilever and to control an interaction generated between the probe and the sample; and
   a sample information acquisition circuit configured to acquire sample information including inclination information of a sample surface with respect to the XY plane based on a control result of the interaction control mechanism,
   the interaction control mechanism being configured to control the interaction generated between the probe and the sample in accordance with inclination of the sample surface with respect to the XY plane.

2. The atomic force microscope according to claim 1, wherein
   the interaction control mechanism is configured to control the interaction generated between the probe and the sample based on correction information for correcting change in influence of interaction between the cantilever and the fluid caused by the inclination of the sample surface with respect to the XY plane.

3. The atomic force microscope according to claim 1, wherein
   the interaction control mechanism comprises:
   a vibration element configured to vibrate the cantilever;
   a vibration signal generation circuit configured to generate a vibration signal for causing the vibration element to vibrate the cantilever in a predetermined vibration state, and to supply the vibration signal to the vibration element;
   an interaction detection sensor configured to detect a vibration state of the cantilever, and to output the vibration state as interaction information including information on the interaction between the probe and the sample;
   an interaction reference information setting circuit in which interaction reference information indicating a desired magnitude of the interaction between the probe and the sample is set;
   a Z scanner configured to perform a scan between the cantilever and the sample relative to each other along a Z axis perpendicular to the XY plane;

a Z control circuit configured to control the Z scanner based on a deviation between the interaction information and the interaction reference information; and an inclination correction circuit configured to change a magnitude of at least one of the vibration signal, a signal of the interaction information, and a signal of the interaction reference information, in accordance with the inclination of the sample surface with respect to the XY plane.

4. The atomic force microscope according to claim 3, wherein
the inclination correction circuit comprises an inclination correction information generation circuit configured to generate inclination correction information based on the inclination information of the sample surface with respect to the XY plane, and an adjustment circuit configured to change a magnitude of at least one of the vibration signal, the signal of the interaction information, and the signal of the interaction reference information by operating at least one of the vibration signal, the interaction information, and the interaction reference information with the inclination correction information.

5. The atomic force microscope according to claim 4, wherein
the inclination correction information is composed of X inclination correction information on an inclination of the sample surface along an X axis, and Y inclination correction information on an inclination of the sample surface along a Y axis.

6. The atomic force microscope according to claim 3, wherein
the raster scan control mechanism comprises an X scanner configured to perform a scan between the cantilever and the sample relative to each other along an X axis, a Y scanner configured to perform a scan between the cantilever and the sample relative to each other along a Y axis, and an XY control circuit configured to generate an X scanning signal and a Y scanning signal, thereby respectively controlling the X scanner and the Y scanner, and
the inclination correction circuit comprises an adjustment circuit configured to change a magnitude of at least one of the vibration signal, the signal of the interaction information, and the signal of the interaction reference information by operating at least one of the vibration signal, the signal of the interaction information, and the signal of the interaction reference information with the X scanning signal and the Y scanning signal.

7. An atomic force microscopy comprising:
a sample table configured to hold a sample in a fluid;
a cantilever configured to move relative to the sample table; and
one or more circuits configured to:
scan the cantilever across an XY plane of the sample in the fluid while vibrating the cantilever;
detect a first interaction between the cantilever and the sample;
calculate an inclination on a surface of the sample based on the first interaction;
control an interaction between the cantilever and the sample based on the inclination.

8. The atomic force microscopy according to claim 7, wherein the one or more circuits are configured to:
receive correction information based on the inclination, the correction information is relative to a second interaction between the cantilever and an external environment of the sample; and
control the interaction between the cantilever and the sample based on the inclination and the correction information.

9. The atomic force microscopy according to claim 7, wherein the one or more circuits configured to:
receive correction information based on the inclination, the correction information is relative to a second interaction between the cantilever and an external environment of the cantilever; and
control the interaction between the cantilever and the sample based on the inclination and the correction information.

10. The atomic force microscopy according to claim 7, wherein the one or more circuits configured to:
detect a vibration state of the cantilever;
detect the first interaction based on the vibration state;
generate a signal so as to vibrate the cantilever based on the inclination.

11. A controlling method of an atomic force microscopy, the controlling method comprising:
scanning a cantilever across an XY plane of a sample in a fluid while vibrating the cantilever;
detecting a first interaction between the cantilever and the sample;
calculating an inclination relative to the XY plane on a surface of the sample based on the first interaction;
controlling an interaction between the cantilever and the sample based on the inclination.

12. The controlling method according to claim 11, further comprising:
receiving correction information based on the inclination; and
wherein the controlling method comprises controlling the interaction between the cantilever and the sample based on the inclination and the correction information,
wherein the correction information is relative to a second interaction between the cantilever and an external environment of the sample.

13. The controlling method according to claim 11, further comprising:
receiving correction information based on the inclination; and
wherein the controlling method comprises controlling the interaction between the cantilever and the sample based on the inclination and the correction information,
wherein the correction information is relative to a second interaction between the cantilever and an external environment of the cantilever.

14. The controlling method according to claim 11, further comprising:
detecting a vibration state of the cantilever;
detecting the first interaction based on the vibration state;
generating a signal so as to vibrate the cantilever based on the inclination.

* * * * *